Figure 1:
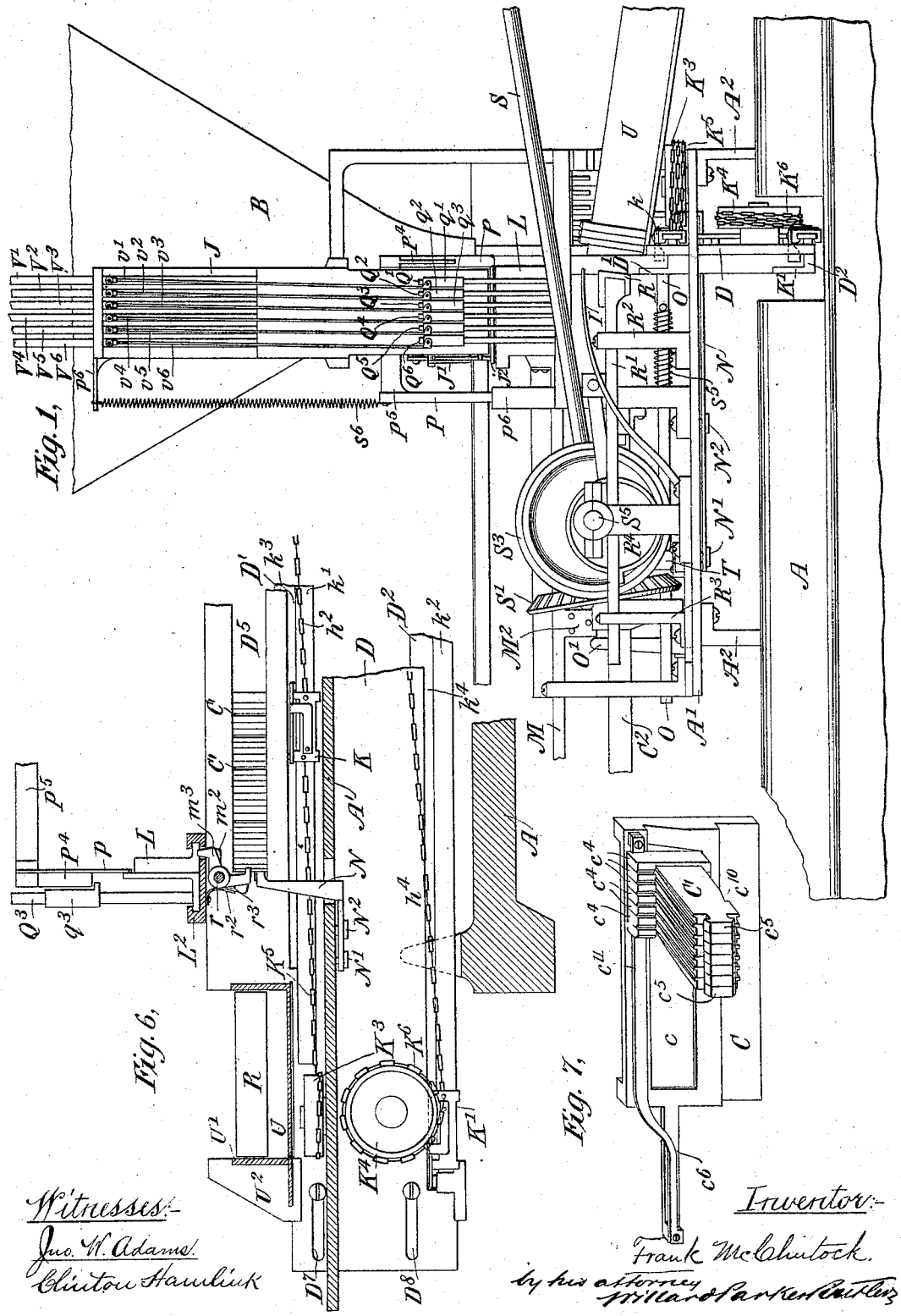

No. 608,002. Patented July 26, 1898.
F. McCLINTOCK.
MACHINE FOR JUSTIFYING TYPE.
(Application filed Dec. 8, 1894.)

(No Model.) 7 Sheets—Sheet 1.

No. 608,002. Patented July 26, 1898.
F. McCLINTOCK.
MACHINE FOR JUSTIFYING TYPE.
(Application filed Dec. 8, 1894.)
(No Model.) 7 Sheets—Sheet 2.

Witnesses:
John W. Adams
Clinton Hamlink

Inventor:
Frank McClintock
by his attorney
Willard Parker Butler

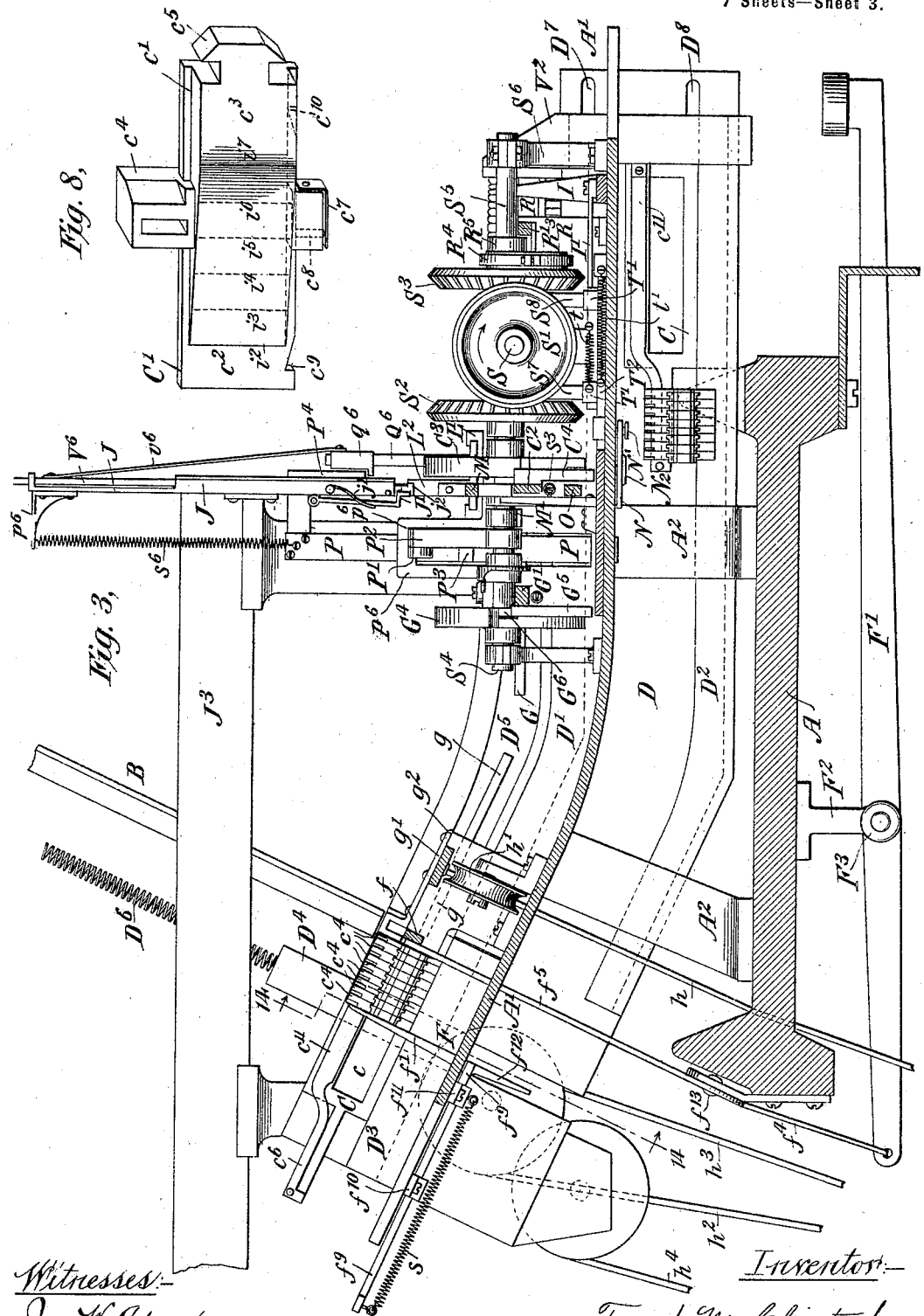

No. 608,002. Patented July 26, 1898.
F. McCLINTOCK.
MACHINE FOR JUSTIFYING TYPE.
(Application filed Dec. 8, 1894.)
(No Model.) 7 Sheets—Sheet 4.
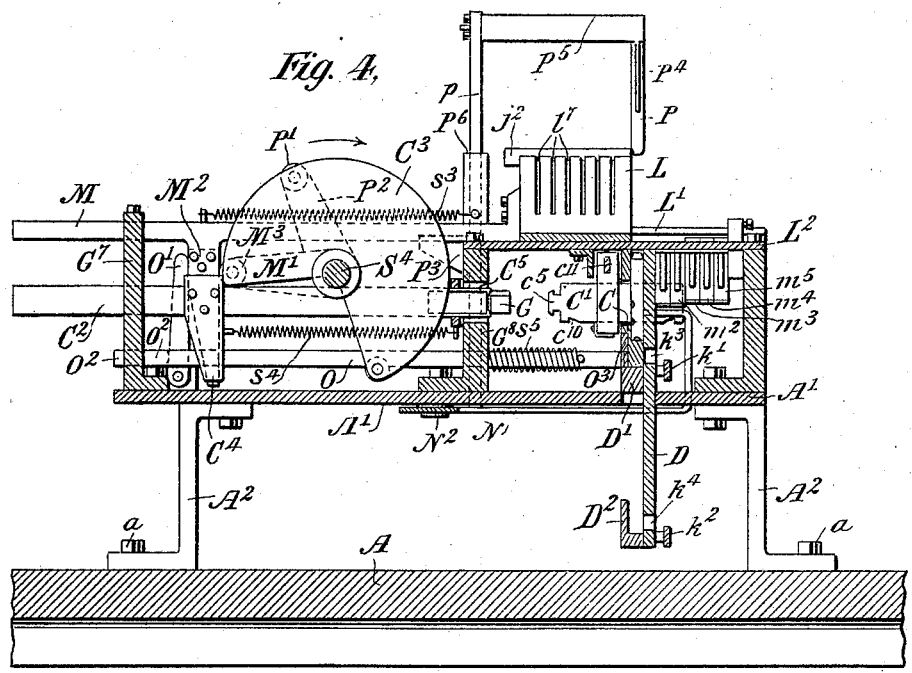
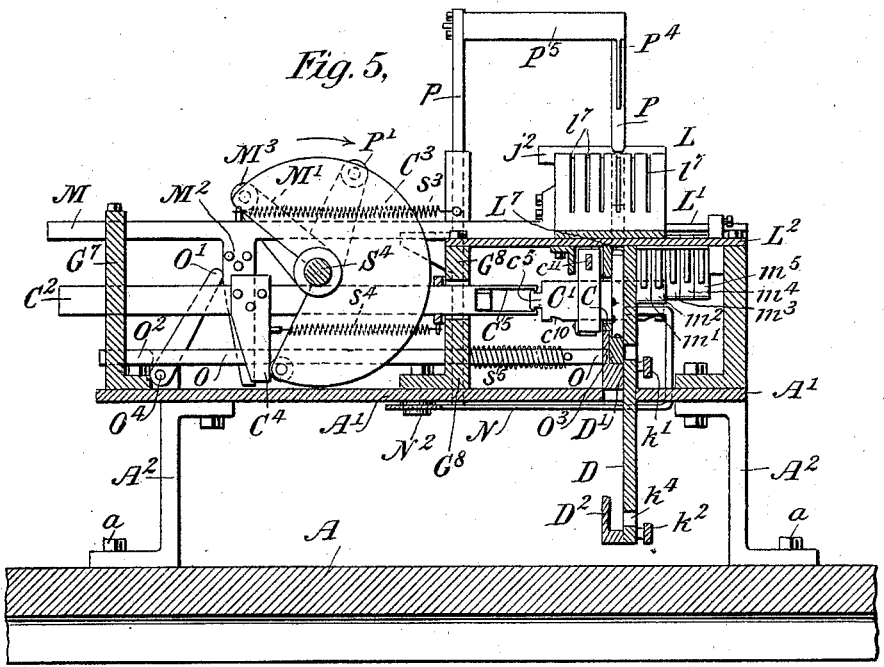

No. 608,002. Patented July 26, 1898.
F. McCLINTOCK.
MACHINE FOR JUSTIFYING TYPE.
(Application filed Dec. 8, 1894.)
(No Model.) 7 Sheets—Sheet 5.
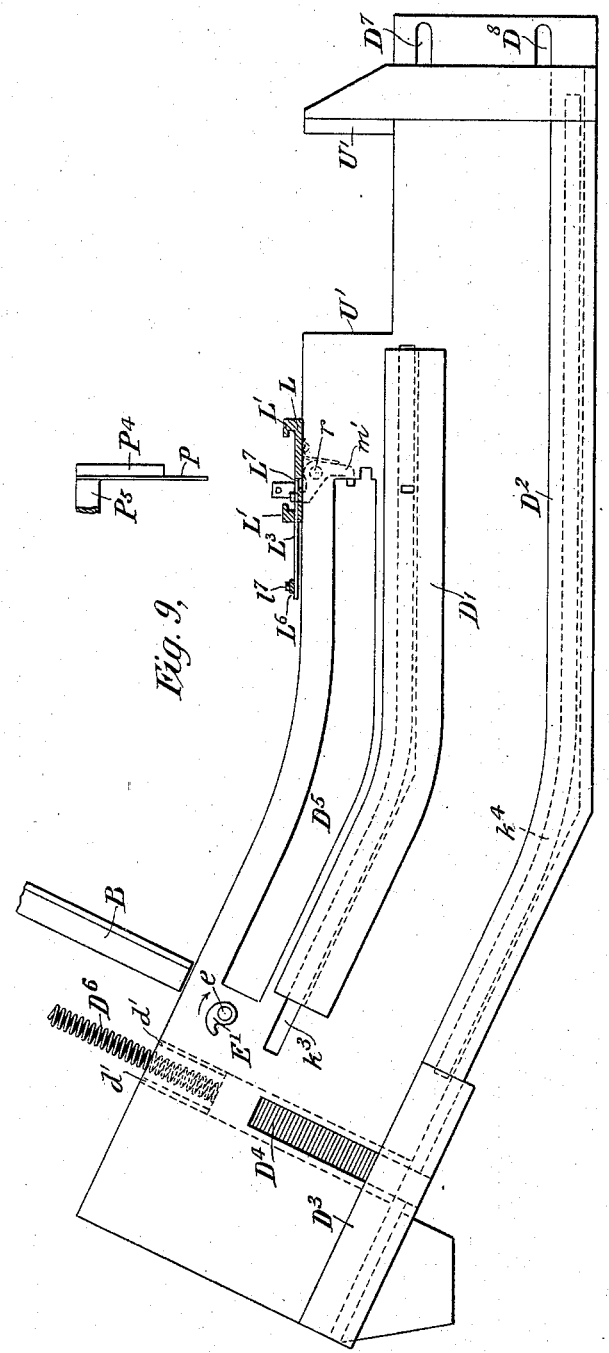
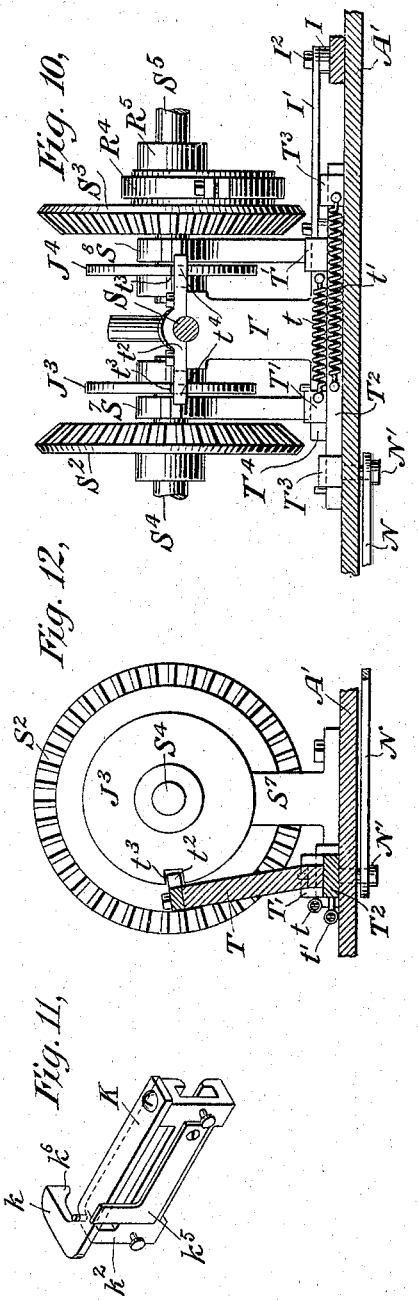
Witnesses
DeWitt H Lyon
Henry H Graff
Inventor
Frank McClintock
By his Attorney
Willard Parker Butler No. 608,002. Patented July 26, 1898.
F. McCLINTOCK.
MACHINE FOR JUSTIFYING TYPE.
(Application filed Dec. 8, 1894.)
(No Model.) 7 Sheets—Sheet 7.

Witnesses
DeWitt N. Lyon
Henry H. Graff

Inventor
Frank McClintock
By his Attorney
Millard Parker Butler

THE NORRIS PETERS CO., PHOTO-LITHO., WASHINGTON, D. C.

UNITED STATES PATENT OFFICE.

FRANK McCLINTOCK, OF GRAND JUNCTION, COLORADO, ASSIGNOR TO THE EMPIRE TYPE SETTING MACHINE COMPANY, OF WEST VIRGINIA.

MACHINE FOR JUSTIFYING TYPE.

SPECIFICATION forming part of Letters Patent No. 608,002, dated July 26, 1898.

Application filed December 8, 1894. Serial No. 531,240. (No model.)

*To all whom it may concern:*

Be it known that I, FRANK McCLINTOCK, a citizen of the United States, residing at Grand Junction, in the county of Mesa and State of Colorado, have invented certain new and useful Improvements in Machines for Justifying and Spacing Type, of which the following is a specification.

My invention relates to a novel machine or apparatus for justifying and spacing out lines of type to a uniform length or measure.

Briefly stated, the method consists in introducing wedged space-bars between the words in lieu of ordinary spaces as the type are composed or set in a line-holder, which is gaged to the exact length it is desired to have the finished line, forcing all of the space-bars simultaneously through the line until it is spread or spaced out to entirely fill the holder, removing the space-bars successively and substituting ordinary spaces of equal or slightly less thickness than the space-bar at the point it enters the line, and driving or forcing the remaining space-bars simultaneously farther into the line to again expand it, so as to fill the holder whenever a substituted space is of less thickness than the removed space-bar. These operations may be performed by hand; but in order that the method may be used in justifying and spacing type set by composing-machines, where manual labor would be too slow and expensive, I have devised a machine which is entirely automatic in its action, which rapidly and accurately performs the several operations above mentioned, and which also removes the completed line of type to a galley.

Such a machine is shown in the accompanying drawings, in which—

Figure 2:
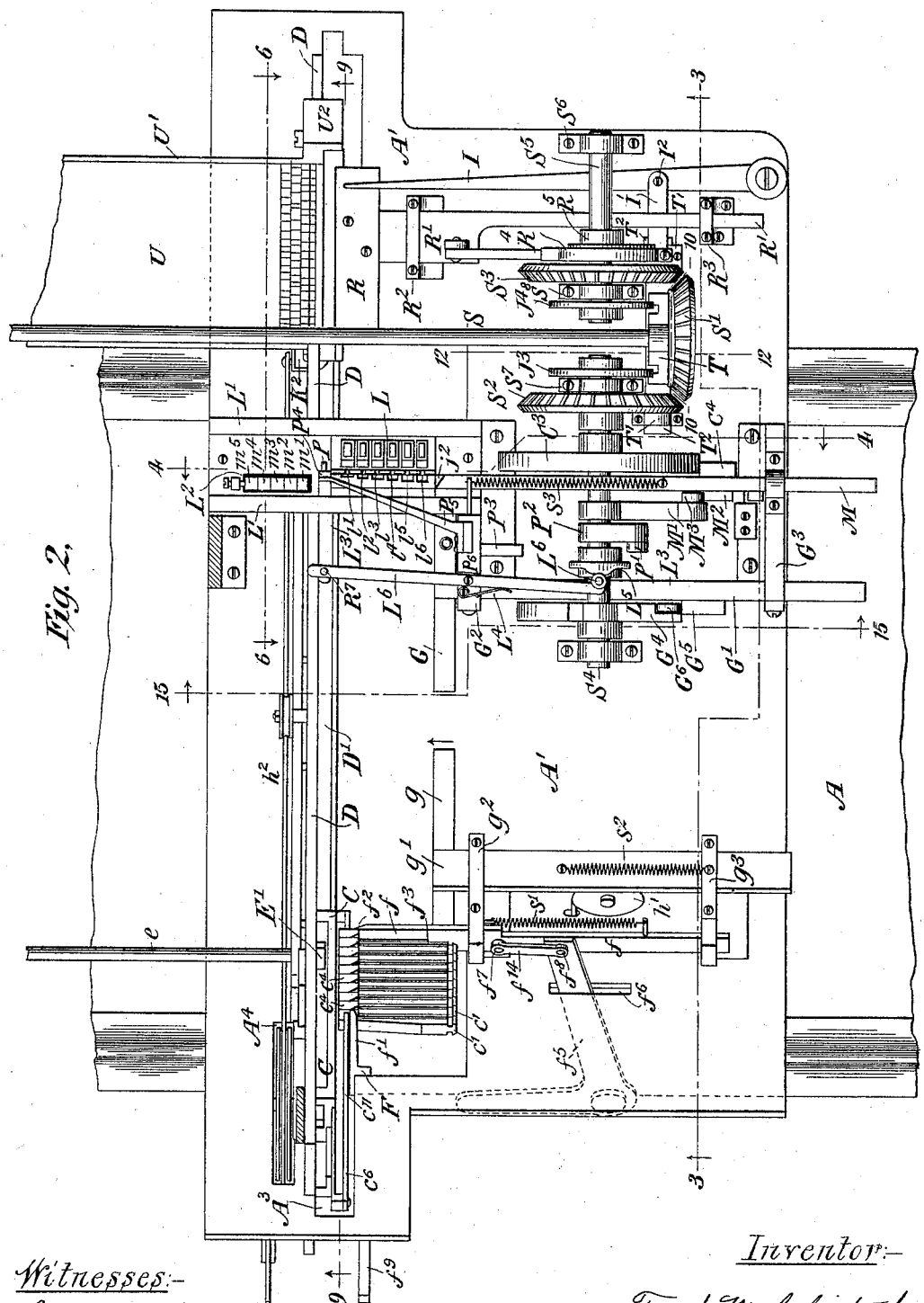
Figure 13:
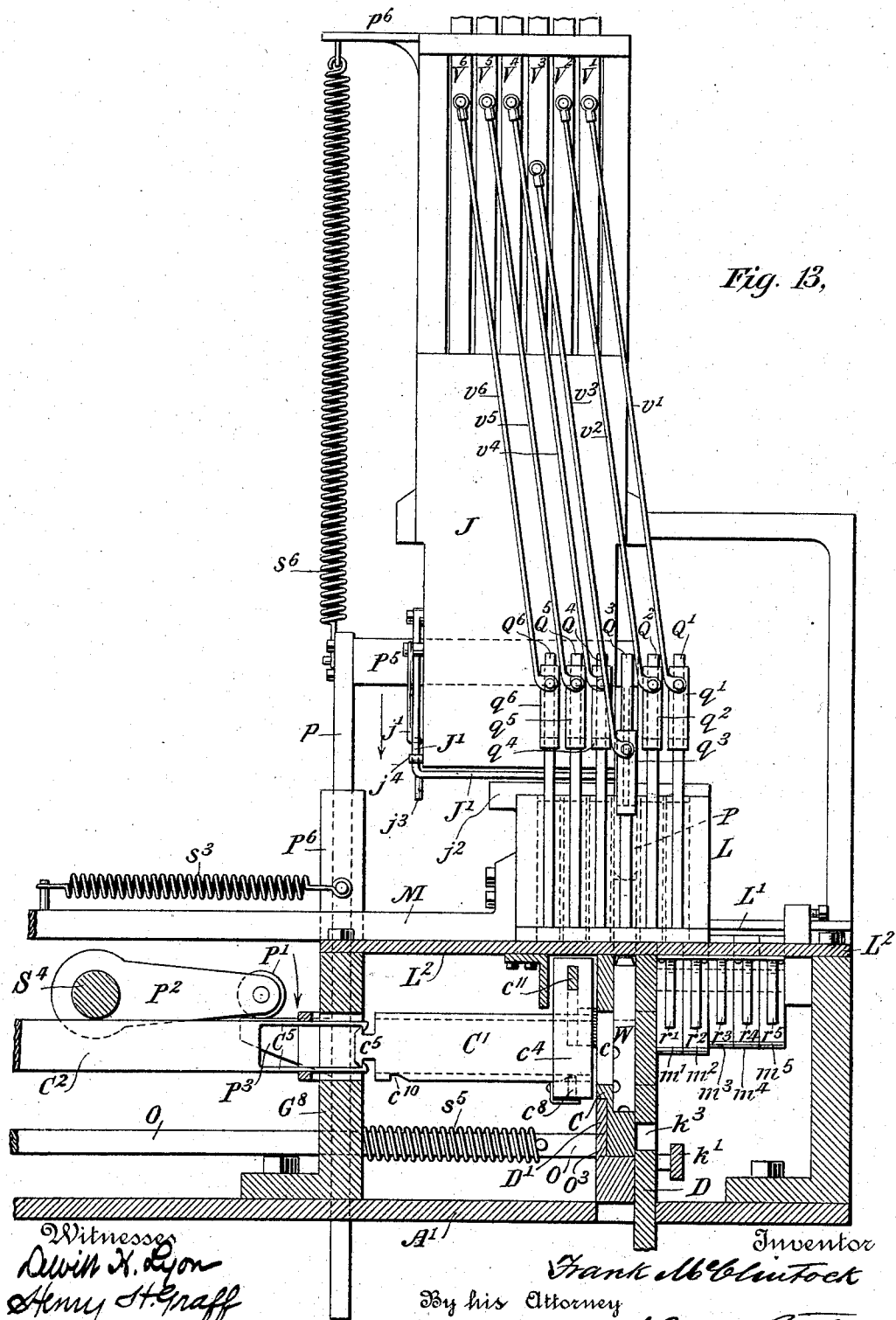
Figure 14:
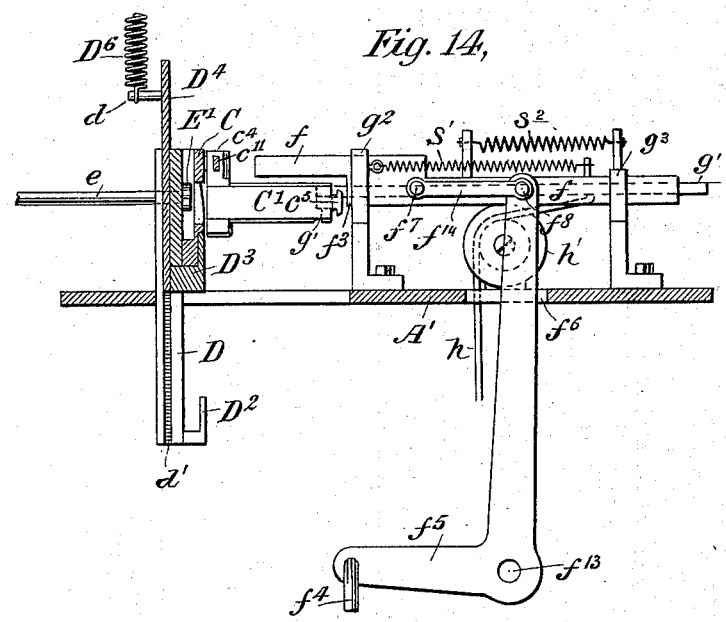
Figure 15:
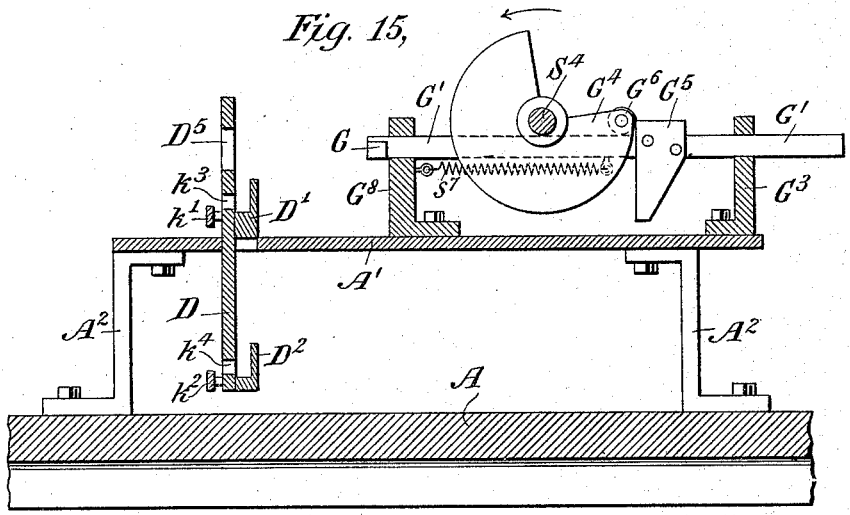

Figure 1 is a front view of the machine complete with the line-gage removed; Fig. 2, a top plan view of the entire machine with the space channels and slide removed; Fig. 3, a side sectional view substantially on the line 3 3 of Fig. 2; Fig. 4, a front sectional view substantially on the line 4 4 of Fig. 2, showing the mechanism for operating the reciprocating space-holder, the line-holder brake or stop, the space-bar extractor, and the space-inserting rod, all being in their normal positions and showing a line of type in position for spacing; Fig. 5, the same view as Fig. 4 after the shaft and the parts secured thereto have made part of a revolution; Fig. 6, a side sectional view on the line 6 6 in Fig. 2; Fig. 7, a perspective view of a line-holder with space-bars attached complete. Fig. 8 is an enlarged perspective view of a space-bar complete; Fig. 9, a sectional view of the plate along which the line-holders slide, showing certain details of the mechanism on the line 9 9 of Fig. 2; Fig. 10, a detail view of the mechanism for shifting the bevel on the line 10 10 of Fig. 2; Fig. 11, a detail view of the mechanism for engaging the line-holders; Fig. 12, a detail sectional view of the mechanism for throwing the justifying-machine into gear on the line 12 12 of Fig. 2; Fig. 13, an enlarged sectional view along the line 5 5 of Fig. 2, showing the method of supplying spaces to the space-holder; Fig. 14, a detail sectional view of the device for inserting the space-bars into the line of type; Fig. 15, a sectional view of the same for driving in the wedges after the insertion of each space on the line 15 15 of Fig. 2.

Similar letters refer to similar parts in all of the views.

The machine comprises in its construction, first, a line holder or holders, which hold a line of type and which also determine and limit the length of the line, which are provided with longitudinal openings of less width than the length of the type, into which the type are set or transferred and which travels along a suitable track or way to the spacing and justifying mechanism, and thence to a galley; second, a series of wedge-shaped or tapering space-bars, preferably secured permanently to the line-holders, which are inserted between the words in lieu of ordinary spaces after each word is set up in the line-holder, and suitable mechanism for inserting the space-bars and for driving them all uniformly farther into or through the line after they are all in place; third, a series of trip-lever stops which, in connection with the space-bars, determine the selection of the spaces of the required thickness to replace the successive space-bars; fourth, a reciprocating space-holder with suitable compartments for containing one space each of the different thicknesses used, with means for moving it to and fro across the line of type, combined with a suitable source of supply; fifth, mechanism for extracting or withdrawing the space-bars successively from the line while the space is being inserted, in combination with suitable space-inserting mechanism to force the spaces from the space-holder entirely down into the line; sixth, mechanism for forcing the space-bars still remaining in the line after the insertion of each successive space to take up and apportion any fractional space, and, seventh, mechanism for removing the completed line of type from the line-holder to a galley and then returning the empty line-holder to the position for receiving another line.

The preferred construction of the mechanism by which these operations are performed may be best explained in connection with the drawings, in which A shows the bed-plate of a type-composing machine; A', the general bed-plate of the present justifying and spacing machine, upon which the mechanism hereinafter to be described is attached; B, the delivery-chute from which the type set by hand or by any convenient typesetting machinery is discharged, the composing-machine shown and described being of that class in which the type are assembled by gravity; U, the galley which is to be filled; S, the shaft connected with any suitable source of power.

The machine, as will be obvious, may be used in connection with any composing-machine that may be arranged to set the type in the line-holder.

For convenience in description the various portions of the mechanism will be described separately, the method of operation of each being described in connection with each portion so far as possible.

*The line-holding mechanism.*—The line-holder consists of a rectangular box C, preferably of metal, provided with a hollow interior of such dimensions as to fit the type of the particular body which is in use. The line-holders C, of which two or more are used with each machine, are fitted to slide freely along a suitable track D', near the central part of the main plate D, which extends the entire length of the machine. In Figs. 2 and 3 a line-holder C is shown in the proper position directly under the type-delivery chute B of the composing-machine. This portion of the track, as shown in Fig. 3, is substantially at right angles to the said chute and thus forms an angle with the horizontal portion of the track. The line-holders C C, which are really composing-sticks holding a single line of type, have longitudinal openings or slots $c$, extending the entire length of the recessed portion, which holds and limits the length of the line. A longitudinal opening $D^5$ of substantially the same width through the plate D is directly in line with this opening, as seen in Figs. 3 and 9, and extends from the point where the space-bars, which will be hereinafter described, are inserted in the line to the point where they are removed. The opening $c$ allows the space-bars to be moved freely longitudinally through the holder C between the type, and the opening $D^5$ in the plate D allows the holder, with its contained type, to move freely along the track D'. While I prefer to construct the line-holder as shown, with one side entirely open, the plate D serving to inclose and confine the type therein during the progress of composition and the subsequent spacing and justification, it may be constructed, if desired, with the open side permanently closed and having a similar longitudinal opening, in which case it would be necessary to change the method of and mechanism for removing the line from the holder to the galley. It is evident that the type may be set or assembled in the line-holder either singly or by successive words or parts of words, or the entire line may first be assembled and transferred bodily into it.

For the purpose of advancing or feeding the line of type as well as the line-holder a cam E' is provided, as shown in detail in Figs. 2 and 9, which is secured to a shaft $e$, which is revolved rapidly by any convenient method. Each type as it drops down into the line-holder is caused thereby to advance along the track D' a distance equal to its thickness. This arrangement may be modified or similarly-acting mechanism of a different character may be used when the type are set or transferred to the line-holder in any other manner; but the cam mechanism is preferable when the type are set by gravity into the line-holder. (Shown in the drawings.)

For the purpose of moving the line-holder, after the same is filled and the space-bars have been inserted, to the space-inserting mechanism and thence to the galley, where the justified line is discharged, and thence back to its original position, ready to receive a new line of type, a sliding frame K is provided, as shown in Fig. 11. This frame is attached at one side by a cord or chain $h^2$ to a treadle, which will be hereinafter referred to, and is arranged to slide freely along a track or way $k'$, secured to the plate D. A similar frame K' is provided, arranged to slide freely along a track or way $k^2$, also on the plate D, but below and parallel to the track $k'$. This frame K' is in turn attached at one side to a chain or cord $h^4$, which is attached to the same treadle as the cord or chain $h^2$. The frames K and K' are of precisely similar construction and each has on its upper surface a spring-catch $k$, held in place, as shown in Fig. 11, by the flat spring-plate $k^5$. The point or extremity of the spring-catch $k$ projects in the case of the frame K through a slot $k^3$, cut through the plate D a sufficient distance, so that the frame K engages the lower part of the line-holder C on the upper track D', when it is drawn back beyond its rear end, and the frame $k'$ engages the front end of the empty line-holder on the lower track $D^2$.

Two drums $K^3$ and $K^4$ are provided, attached, as shown in Fig. 6, to the plate D, preferably near the galley. These contain coiled springs and are provided with the cords or chains $K^5$ and $K^6$, coiled around them. When the frames K and K' are caused to move by the depression of the treadle, to which the cords $h^2$ and $h^4$ are attached, the drums $K^3$ and $K^4$ are rotated, and thus wind up the coiled springs contained in them, and when the tension on the cords $h^2$ and $h^4$ is released the tension of the springs in the drums $K^3$ and $K^4$ serves to pull the two frames K and K' forward to their normal positions. A short section $D^3$ of the upper track, of a length at least equal to that of the line-holder, is not secured to the main plate, but, on the contrary, is securely attached to the lower end of an upright plate $D^4$, which latter plate slides in suitable ways $d'$ $d'$, Fig. 9, in the plate D at right angles to the track D', as shown in Fig. 3. This sliding plate $D^4$, with the attached short section of track, is held in its normal position, so as to form a continuation of the track D', as shown in Fig. 3, by a spring $D^6$, attached to the frame of the machine; but it may be drawn down until this short section of track $D^3$, attached thereto, is in line with and forms a continuation of the lower track $D^2$ by means of the cord or rod $h^3$, secured to the same treadle as is before referred to.

*The justifying mechanism.*—Instead of ordinary spaces I use tapering or wedge-shaped space-bars C' C', &c., which are inserted crosswise into and through the line between the words as the composition proceeds or when the type is transferred to the line-holder to be replaced mechanically by ordinary spaces, as will be fully described later. The space-bars proper, C', are clearly shown in the enlarged perspective view, Fig. 8. They are tapering throughout the greater part of their length. At the inner or thin end they are for a short distance $c^2$ made with parallel side faces, as shown in Fig. 8, in order that after they are inserted in position the next following type may be set in proper rectilineal position against them in the line. At the outer or thick end the hangers are also for a short distance $c^3$ made with parallel side faces, as shown, in order to permit them to come together as closely as possible, that part of the wedge extending from $i^7$, the outer end being used only for manipulating the space-bar by means of the mechanism to be hereinafter described and never being inserted in the line for the purpose of spacing it out. This construction is essential in order that the space-bars in their normal position shall be sufficiently close together, so that after their insertion on either side of short words or single letters in the line they will not bind together in such a way as to make it difficult to push them forward when used in the operation of spacing out the line. I prefer to permanently secure a sufficient number of space-bars to meet the requirements of any line to each of the line-holders used in the manner shown, the space-bars proper, C', being fitted to slide freely longitudinally in hangers $c^4$, which are suspended from a way $c^{11}$, secured to the front of the line-holder. That part of the way which extends along the opening in the line-holder is at the proper height to bring the space-bars C' C', &c., directly opposite said opening, while that portion $c^6$ extending beyond the line-holder is depressed, as shown in Fig. 7, sufficiently to lower such of the space-bars as may not be needed in any line out of the way of the mechanism which acts on the space-bars during operation of spacing and justification. It will be apparent that an essential feature of the machine as at present constructed is the insertion of the space-bars crosswise into the line, an arrangement not shown by any existing machine. In order to limit the longitudinal movement of the space-bars proper, C', in the hangers $c^4$, I attach a spring $c^7$ to the lower part of the hanger, which forces a pin or catch $c^8$ up against the lower flange of the space-bar C'. Two notches $c^9$ and $c^{10}$ in the flange near each end of the space-bar engage this pin, and the notches are so located as only to allow the space-bar to move to and fro within the desired limit.

I do not wish to limit myself to any particular manner of attaching the space-bars to the line-holder, nor is their attachment essential, as with the space-bars entirely independent of the line-holder and inserted in the line of type by suitable independent mechanism the subsequent spacing and justification may be effected in the same manner as here shown and described. I find, however, that in practice their permanent attachment to the line-holder is preferable, as it allows of their being set or inserted in the line and removed and placed in position for use again with more certainty and accuracy and with simpler mechanism.

In order that the space-bars may not partake of the forward movement of the line-holder C, but may be held in the proper relative position with reference to the type-delivery chute B and cam E', so that the foremost space-bar may at any time be inserted in the line immediately behind the last type set, a space-bar-inserting rod $f$ is provided, as shown at the left of Figs. 2 and 3 and more clearly in Fig. 14, sliding in the bearings $g^2$ and $g^3$. The forward end $f^2$ of the inserting-rod $f$, which is slightly beveled, as shown, in order to enter properly between the hangers, engages the hanger $c^4$ of the foremost space-bar $c'$, while the shoulder $f^3$ engages the rear end of the space-bar proper. An arm F, supported on the sliding rod $f^9$, sliding in the bearings $f^{10}$ and $f^{11}$ on the plate D and actuated by the spring $s$, engages the hangers $c^4$ $c^4$, &c., and serves to force the entire body of space-bars against the space-bar-inserting rod $f$, and also feeds them forward as fast as used. When the last type in any single word has been set and it is desired to insert a space-bar, a suitable space key or lever F' is provided, which is depressed by the hand, thus forcing up the rod $f^4$, which, acting through the bell-crank $f^5$, passing up through the opening $f^6$ in the plate A', and the toggle-link $f^{14}$, pivoted to the bell-crank at $f^8$ and to the inserting-rod at $f^7$, draws the inserting-rod $f$ back until the point $f^2$ and shoulder $f^3$ are clear of the outer end and hanger, respectively, of the space-bar C', as shown in Fig. 14. The spring $s$, acting on the arm $f'$ of the space-bar-feeding rod, at once advances all of the space-bars in a body forward until they engage the end of the line-spacing bar $g$, this forward movement being equal to the thickness of the inserting-rod $f$. When the space-key F is released, a spring $s'$ forces the inserting-rod $f$ forward to its normal position, and the shoulder $f^3$ engages with the rear end of the foremost space-bar and pushes it into the line of type until the point $i^2$, where the taper upon the space-bar begins, is exactly in a line with the outer edge of the type. The cam E' then advances the space-bar $c'$, together with the line-holder C, in the same manner as it does the type, allowing the next succeeding type to drop into the line-holder just behind the space-bar. The movement of the space-bars farther through the line of type after their insertion by the inserting-bar in order to justify the line of type is effected by the so-called "line-justifying bar." The line-justifying bar $g$ is secured to a bar or rod $g'$, which slides freely longitudinally in bearings in the uprights $g^2$ and $g^3$, as is shown in Fig. 2, and is parallel with and of the same length as the line-holder C, as appears from this figure. This justifying-bar $g$, which slides in the direction of the arrow shown in Fig. 2, serves to force all of the space-bars simultaneously farther into the line until the line is spread or spaced out, so as to entirely fill the line-holder C. The justifying-bar $g$ is attached to a plate $g'$, which slides in bearings $g^2$ $g^3$, Fig. 2, on the frame-plate A' of the machine, and motion is imparted thereto by a chain or cord $h$, which passes over a pulley $h'$ and is preferably connected at its end to the same treadle to which the shifting frames K and K' are attached, as above described. This treadle may be of any convenient construction, and it is therefore not necessary to be shown, and is arranged in any convenient manner, so that it may be depressed by the foot of the operator. A spring $s^2$ is provided, one end of which is attached to the plate $g'$ and the other is made fast to the bearing $g^3$, whereby this plate and the justifying-bar $g$ are normally held back from the space-bars and are only advanced when pressure is inserted on the treadle.

The line-holder C is filled as nearly as can be, according to the judgment of the operator. This may be determined by direct observation of the holder itself or of a suitable index conveniently located. When this has been accomplished, the depression of the treadle referred to will effect, practically simultaneously, the following results: The line-spacing bar $g$ will be forced against the ends of all the space-bars in the line, thus driving them in and spreading the words farther apart until the line entirely fills the holder, the sliding frame K will be drawn backward until the catch $k$ will engage the rear end of the line-holder, the short section of track $D^3$ will be drawn down in line with the lower track, as shown in Fig. 9, and the sliding frame K' drawn back, and with it the empty line-holder, along the lower track $D^2$ and upon or onto the short movable section of track $D^3$. When the treadle is released, the spring $s^2$ draws the line-justifying bar $g$ back to its normal position. The coiled springs in the drums will rotate the drums $K^3$ and $K^4$, so as to wind up the chains or cords $K^5$ and $K^6$, thus drawing the sliding frames K K' forward, the lower one being at once returned to its normal position, while the upper one will draw the line-holder C, with the line of type contained therein, forward until the first space-bar C' reaches the end of the longitudinal opening in the plate D, thereby bringing it to rest in position ready for the commencement of the operation of removing the space-bars C' C', &c., and replacing them with ordinary spaces.

The existing relations are clearly indicated in Fig. 9. The short section of track $D^3$, with the empty line-holder on it, is simultaneously raised up by the spring $D^6$, thus bringing the line-holder C in position ready for the composition of another line of type, as shown in Fig. 3.

In place of the treadles referred to above suitable cams may be provided on a shaft actuated from a suitable source of power for actuating the various parts moved by the treadles.

*The space-bar-removing mechanism.*—The mechanism employed in the removal of the space-bars and to permit the automatic selection and insertion in their stead of the required spaces by means of the space selecting and inserting mechanism hereinafter described in the two cases which can occur, first, when the number of units required to space out the line is a multiple of the number of spaces in the line, and, second, when the number of units required is not such a multiple is substantially as follows: In the first case it may be assumed that a line has been set containing six words and the five space-bars required between the words, which line lacks ten units of filling the line-holder. This shortage, with the ten units of spacing already in the line or two units to each space-bar, will make a total of twenty units of spacing required. It will be evident, therefore, that when the space-bars are forced in by the line-justifying bar $g$ they will penetrate into the line up to the point $i^4$, where the thickness of the space-bar $C'$ is exactly four units. The line-holder having been drawn forward, as before described, until the first space-bar, by engaging with the end of the space-bar slot $D^5$, is brought to rest, the projecting end of this space-bar $C'$ will engage with and trip the two inner trip-levers $m'$ and $m^2$, as shown in Fig. 4. This space-bar, as it approaches the place of rest, will also engage the free end of a lever N, pivoted at $N^2$ to the frame A', as shown in Fig. 6, which lever will operate to set the space-bar-withdrawing mechanism in action.

*The space-selecting mechanism.*—The mechanism (after removing the space-bars) for selecting ordinary spaces of the required thickness to properly and fully space out the line is described in detail as follows: A space holder or rack L, as shown in Fig. 2, having compartments $l'$, $l^2$, $l^3$, $l^4$, $l^5$, and $l^6$ corresponding in number with the different spaces used, is fitted or arranged to slide freely longitudinally in the parallel ways L' L' across the line of type in the line-holder and is so adjusted that as it moves across the line each space-compartment will be brought successively directly above any given space-bar in the line when the latter is at rest against the end of the space-bar slot $D^5$, Figs. 3 and 9, with the front faces of the compartments together with the spaces normally contained therein and the front or flat side of the particular space-bars which are to be removed in the same vertical plane. The several compartments of the space-holder rack L are open both at top and bottom and are provided with a series of narrow slots $l^7$ $l^7$, cut partly down the front of the holder, as shown, for example, in Figs. 4 and 5. The plate $L^2$ serves as a bottom for closing the compartments $l'$ $l^2$ $l^3$ $l^4$ $l^5$ $l^6$ of the space-holder. An opening $L^7$ is provided through this plate $L^2$, as shown in Figs. 2 and 9, directly over the line of type, through which the space selected can drop through into its place in the line; but the opening is normally closed except during the operation of inserting the space by means of the sliding plate or valve $L^3$, which is opened at the proper time by the spring $L^4$, controlled by the cam $L^5$, acting on the outer end of the lever $L^6$. The space-holder L is attached to a sliding bar M, sliding at right angles to the line of feed of the type in the bearing $G^3$, as shown in Fig. 4. The bar M is provided with an arm $M^2$, which projects downward and engages with a crank M', provided with the roller $M^3$. The crank M' rotates upon a shaft $S^4$, to which motion is imparted in the manner described. A spring $s^3$ is provided which tends to pull the space-holder constantly forward and to hold it in the position shown in Fig. 4 except during the revolution of the crank.

For the purpose of selecting the proper space to be inserted in the place of any space-bar the so-called "trip-lever" mechanism is provided. This consists of a series of trip-lever stops $m'$, $m^2$, $m^3$, $m^4$, and $m^5$ of substantially the form shown in Fig. 6, pivoted on a shaft $r$, with their upper extremities normally projecting through the plate $L^2$, as shown in Fig. 2, above the base of the space-holder C, as shown in Figs. 4, 5, and 6, and which are held in normal positions by the flat springs $r'$, $r^2$, $r^3$, $r^4$, and $r^5$, placed back of each stop. These stops are so adjusted that as the space-holder L moves from its normal position toward the line, as shown in Fig. 2—that is, toward the right hand—when it strikes the first of the trip-lever stops $m'$ the thin space $l'$ in the first compartment will be directly over the line of type, and as the trip-lever stops $m^2$, $m^3$, $m^4$, and $m^5$ are successively brought to the position shown by the two first levers in Figs. 4, 5, and 6 each successive stop will bring the space-rack to rest in such position that the corresponding compartment will come or stop directly over the line. The lower arms of the trip-lever stops $m'$ $m^2$ $m^3$ $m^4$ $m^5$ extend beyond the end of the space-bar slot $D^5$, as is shown in Fig. 6, in such a way that the thin end of any space-bar which may extend a sufficient distance through the line will engage with and trip one or more of these stops, as shown in Figs. 3, 4, 5, and 13, in which figures the two first stops $m'$ and $m^2$ are shown so tripped as to permit the space holder or rack L to be moved to the right by means of the spring $s^3$, which brings it into contact with the third stop $m^3$, with the space $l^3$ in the third compartment directly over the line ready to be dropped through the opening $L^7$, as shown in Fig. 5.

In the machine shown and described six different spaces are used, varying uniformly from two-eighths to seven-eighths of an "em" in thickness; but the holder may be arranged to hold any convenient number and the machine may be modified accordingly. As one-eighth of an em is taken as the unit it is evident that the spaces $l'$, $l^2$, $l^3$, $l^4$, $l^5$, and $l^6$ will have a thickness, respectively, of two, three, four, five, six, and seven units, and the space-bars $C'$ having a thickness of two units at the point $i^2$, where the taper begins, and a thickness of seven units at the point $i^7$, where the taper ends, it will also be evident that at the intermediate points indicated by the broken lines $i^3$, $i^4$, $i^5$, and $i^6$ along the tapering portion the space-bar will have a thickness, respectively, of three, four, five, and six units. The space-bars $C'$ and the trip-lever stops $m'$, &c., are so adjusted relatively to each other that the space-bar $C'$ will not project a sufficient distance through the line of type in line-holder C to engage and trip the first lever $m'$ until the point $i^3$ on the space-bar $C'$ has reached the line of type, thereby indicating that a three-unit space will be required to replace the space-bar within the line and also, when the space-bar has entered the line to the points $i^4$, $i^5$, $i^6$, and $i^7$, respectively, indicating the even units, it will engage and trip successively the levers $m^2$, $m^3$, $m^4$, and $m^5$. The space-holder L is shown in all of the drawings except Figs. 5 and 13 normally held in position with each compartment directly under a corresponding chute or slide J, which serves to guide the spaces as required from the space-channels V', $V^2$, $V^3$, $V^4$, $V^5$, and $V^6$, which contain a full supply of the different sizes used down into the proper compartments to replace spaces which are inserted into the line. The spaces are inserted into these compartments by hand or by machinery. A swinging gate or stop J', actuated by a light spring $j'$, as shown in Fig. 13, which, normally held clear of the lower end of the chute J by a lug $j^2$ on the rear face of the space-holder, engaging the stud $j^3$, swings forward and closes the chute when the space holder or rack L moves toward the galley or forward and to the right hand, so that any space which may be forced out of the space-channels will drop down the chutes and rest on the stop until the space-holder is again returned to its normal position, at which time the space will be free to drop into the proper compartment in the space holder or rack L.

The space-bars C' are removed by a reciprocating bar called the "space-bar extractor" $C^2$, which is arranged to slide horizontally, as shown in Fig. 4, and is held in its normal position by the cam $C^3$, also rotating on the shaft $S^4$, engaging the hanging arm $C^4$ on the extractor-bar. A spring $s^4$ is provided which, when the periphery of the cam $C^3$ is no longer in contact with the arm $C^4$, immediately draws the extractor-bar in until the spring-hooks $C^5$ $C^5$, which are provided at its extremity, engage with the hooks $c^5$ on the space-bar C' and firmly hold them. As the shaft $S^4$ continues its revolution the space-bar C' is quickly withdrawn from the line by means of the cam $C^3$ acting upon the arm $C^4$ of the space-bar extractor $C^2$, which latter is thus returned to its normal position. A shaft S is provided which is kept in continuous revolution from any convenient source of power and is provided with a bevel gear-wheel S', secured to the lower end of the shaft, and a bearing in the journal-box T, which may be moved a short distance either backward or forward, so as to throw the bevel-wheel S' into gear either with the gear-wheel $S^2$, secured to the shaft $S^4$, which shaft actuates the spacing mechanism, or into gear with the gear-wheel $S^3$, which in turn is secured to the shaft $S^5$, which latter shaft actuates the mechanism for removing the line of type from the line-holder C to a galley U, which will be hereinafter described. The bottom of the journal-box T, as shown in Fig. 10, is fitted to slide toward the front of the machine only in guides T', which in turn are secured to a plate $T^2$. The plate $T^2$ is fitted to slide toward the rear only of the machine in the guides $T^3$ $T^3$, which guides are in turn secured to the plate A'. The tension of the springs $t$ and $t'$ serve to hold the journal-box T and bevel gear-wheel S' normally in the position shown in Figs. 2 and 3 midway between the two gear-wheels $S^2$ and $S^3$. The outer end of the pivoted lever N is secured by a pin N' to the end of the plate $T^2$ in such manner that the movement of the lever N, caused by the advancing space-bar striking it, will in turn cause the plate $T^2$, and with it the journal-box T and gear-wheel S', to move backward a sufficient distance to throw the gear-wheels S' and $S^2$ into gear. This thereupon starts the spacing mechanism in motion in the direction of the arrow, as shown in Figs. 4 and 5. In order that the removal of the space-bar by freeing the end of the lever N from the line shall not allow the gear-wheel to swing forward to its normal position out of gear until the shaft $S^4$ has made a complete revolution, a disk or wheel $J^3$ is provided, secured to the shaft $S^4$, which has a notch $t^3$ cut in it large enough to receive the edge of the plate $t^2$. This disk or wheel $J^3$, when in its normal position, as shown in Fig 2, prevents the shaft $S^4$ from rotating; but when it is drawn back with the journal-box T the notch $t^3$ in the plate $t^2$ allows the disk $J^3$, together with the shaft $S^4$ and its attachments, to rotate. The rear shoulder of the notch $t^3$, engaging the disk, prevents the journal T from returning to its normal position after the removal of the space-bar C' until the completion of a full revolution, which is required at each space. Simultaneously with or immediately following the release of the space-bar extractor $C^2$ the arm $M^2$, which is secured to the space holder or rack L, will be released from the normal position, where it is held by the stud $M^3$ on the crank M', which allows the space-holder L to move at once to the right until it strikes the third stop $m^3$, it being the first one projecting up through the plate $L^2$ in its normal position, as shown in Figs. 5 and 13.

*The line-holder brake.*—In order to hold the line-holder C stationary during the operation of inserting the spaces, the line-holder brake is applied, which consists of a horizontal rod O, Figs. 4, 5, and 13, sliding in bearings in the posts $G^7$ and $G^8$. When the space-holder L is released, it also releases the line-holder brake O, which is normally held away from the line-holder by the arm $M^2$, attached to the reciprocating rod of the space-holder, which in turn engages the upper end of the lever O'. A lever O' is provided, pivoted at its lower end $O^4$ to the bed-plate A' and engaging a shoulder $O^2$ on the brake-rod O. The inner end of the brake-rod O is sharpened to a vertical knife-edge $O^3$, which, by means of a strong spring $s^5$, encircling the rod and attached to the post $G^6$, is forced against the lower part of the line-holder C, thus holding it stationary until the operation of removing the space-bar and inserting a space in lieu thereof is completed, as otherwise the line-holder would begin its forward movement again immediately upon the removal of the space-bar.

*The space-inserting mechanism.*—This consists of a space-inserting rod P, which moves vertically up and down, as shown in Figs. 4, 5, and 13, and serves to force the space into the line after the space-bar is removed. The sliding valve $L^3$ is first opened by means of the lever $L^6$, actuated by the cam $L^5$, rotating on the driving-shaft $S^4$, and the spring $L^4$, which permits the four-unit space $l^3$, which is now directly over the line, to drop or be forced down by the space-inserting rod P into the line until it rests upon the upper edge of the space-bar. The position of the several parts at this moment, as well as the construction of this part of the mechanism, is clearly shown in Figs. 5 and 13. The space-inserting rod insures the forcing of the space entirely down into the line in case it should fail to drop under the influence of gravity alone. The space-inserting rod P is attached to the horizontal arm $P^5$, which in turn is attached to the vertical plunger $p$, sliding vertically in suitable bearings $P^6$. The lower portion of the plunger P carries a lug $P^3$. On the shaft $S^4$ is placed a crank $P^2$, which carries at its extremity a roller $P'$, which engages with the lug $P^3$, attached to the plunger-standard $P^6$. A spring $s^6$ is provided, connecting the upper end of the plunger P with any convenient stationary point above it, such as the arm $P^6$ on the top of the space-slide, in order to keep the plunger constantly drawn up, except when acted upon by the crank $P^2$. A series of sleeves $q'$ $q^2$ $q^3$ $q^4$, &c., which slide freely on the posts $Q'$ $Q^2$ $Q^3$, &c., are respectively secured to the ejectors $V'$ $V^2$, &c., by means of cords or wires $v'$ $v^2$, &c., and are forced down by the shoulder $P^4$, projecting beyond the space-inserting rod P, as shown in Fig. 6. This ejector operates to release a four-unit space from the channel containing the supply of that size, which slides down the proper compartment of the slide J until it rests on the swinging gate $J'$. Each of the other sleeves $q'$ $q^2$ $q^3$, &c., is connected, respectively, to the ejectors $V'$ $V^2$ $V^3$, &c., which release in the same manner spaces of two, three, five, six, and seven units. A space of the same thickness as that in process of insertion into the line is thus provided to drop at once into the space-holder on its return to its normal position. When the crank $P^2$ has drawn the space-inserting rod P down to its lowest point and the roller $P'$ has cleared the outer end of the arm $P^3$, spring $s^6$ draws it up at once to its normal position. When the operations above described have all been completed and the shaft $S^4$ has made about two-thirds of a revolution, the stud $M^3$ on the crank $M'$ again engages the arm $M^2$ and forces it out to the position shown in Fig. 4, thus returning the space-holder L and brake-rod O to their normal positions. The line-holder C upon being released thereupon moves forward along the track $D'$ until a second space-bar brings it to rest, as before, whereupon the same operation is repeated and another four-unit space will be inserted in place of the next space-bar, and this operation will be continued until each space-bar in the line has been removed one by one and replaced by a four-unit space, which will fully and accurately space out and justify the line, thus leaving the line-holder C free to move along the track $D'$ to the point of discharge into the galley U without further delay. As the next succeeding space-bar advances to engage the inner end of the lever N before the shaft $S^4$ has entirely completed its revolution, the journal-box T and the gear-wheel $S'$ cannot therefore swing forward when the notch in the disk $J^3$ arrives opposite the shoulder $t^4$ of the plate $t^2$, and therefore the operation of the machine will be continuous until all of the space-bars have been removed and replaced by spaces, as described, one revolution of the shaft being required for each space-bar in the line. When the last space-bar is removed, the lever N will no longer be actuated by the space-bar, and the tension of the springs $t$ and $t'$ restores the journal-box P to its normal position, with the notch in the disk $J^3$ engaging with the shoulder in the plate $t^2$, and the wheel $S'$ no longer engages with the wheel $S^2$ and the shaft $S^4$ can no longer rotate.

*The fractional-spacing mechanism.*—It will be evident from the foregoing description of the method of inserting a one-unit space that any of the other sizes of spaces may be inserted in the same manner whenever the required spacing needed is a multiple of the number of spaces in the line. If, however, the number of units required should not be a multiple of the number of spaces in the line, it is evident that the spaces in the finished line will not all be of the same thickness. For example, suppose a line with five spaces, as before, but requiring twelve units to space it out, making with the space-bars in the line a total spacing in the line of twenty-two units. In such case the space-bars will then be forced into the line by the justifying-bar $g$ to a point two-fifths of the distance from the four-unit point $i^4$ to the five-unit point $i^5$, indicating that four and two-fifths units would be required between each word. As the space-bar still only extends sufficiently far through the line to engage the two first trip-lever stops $m'$ and $m^2$, a four-unit space will be selected and inserted and the space-bar be withdrawn exactly as in the first example. It is evident that now the line will lack two-fifths of a unit of being fully spaced out, and in order to drive in the four remaining space-bars, so as to take up and apportion this fraction between them, a reciprocating space-bar driver is provided (shown in Figs. 2, 3, and 15) which consists, essentially, of the bar G, parallel to the line-holder, and secured to a horizontal bar $G'$, which slides freely longitudinally in bearings in the uprights $G^2$ $G^3$. A spring $s^7$ tends to force the bar G in against the ends of the space-bars remaining in the line; but it is normally held clear of the ends of the space-bars by a cam $G^4$, which engages the downwardly-projecting arm $G^5$, secured to the bar $G'$. This cam $G^4$ is secured to the shaft $S^4$, as shown in Fig. 15, and is so adjusted relatively to the other parts as to release the arm $G^5$ and allow the spring to force the bar G against the space-bars just after the space has been inserted and pushed entirely down in the line and then to draw it back to its normal position before the line-holder has been released from the brake O. The fractional two-fifths of a unit, which is in this manner apportioned among the four remaining spaces, will, it is evident, increase the space between the words to four and one-half units, and the space-bars will be driven into the line to a point half-way between the four-unit point $i^4$ and the five-unit point $i^5$, and another four-unit space will be selected and inserted, as before, leaving one-half of a unit to be apportioned to the three remaining spaces by again driving in the space-bars, which will increase each one to four and two-thirds units. As the next space-bar still only projects sufficiently to engage the two first trip-lever stops, another four-unit space will be selected and inserted, leaving two-thirds of a unit to be apportioned to the two remaining spaces, which will make them each five units, allowing the two remaining space-bars to be again driven into the line up to the five-unit point $i^5$, and as they now project through the line sufficiently to engage the first three trip-lever stops $m'$ $m^2$ $m^3$ the space-holder will again swing over against the third stop and a five-unit space will be selected and inserted as the space-bar is withdrawn. There being now no fractional space remaining, the last remaining space-bar will not be driven any farther into the line on the release of the reciprocating space-bar driver, and consequently another five-unit space will be selected and inserted, thus completing the spacing of the line, which will have three spaces each four units in thickness and two spaces each of five units in thickness, thus making the required total of twenty-two units of spacing in the line. It will be found that whatever may be the number of units required to space out any given line the spaces used will never vary in any one line more than one unit in size, while the various lines will not vary in length more than one unit, which in the examples described is one-eighth of an "em." By using a smaller unit and increasing the number of spaces proportionately the variation in the length of the lines will of course be less.

*The line-removing mechanism.*—After the last space has been inserted in the line the release of the line-holder from the brake O will allow it to continue its forward movement along the track $D'$, while the spacing mechanism will come to rest by the wheel $S'$ being thrown out of gear by the wheel $S^2$. A bunter R of substantially the same length and width as the opening through the line-holder is provided, secured to a reciprocating bar $R'$, which slides freely longitudinally in the uprights $R^2$ and $R^3$, as shown in Figs. 1 and 2. The reciprocating movement of the bunter R is effected by means of an eccentric $R^4$, secured by the collar $R^5$ to the shaft $S^5$. A crank or cam may be used in place of the eccentric wheel, if desired. The bunter R is so adjusted as to stand normally in the position shown in Figs. 1 and 2, with the upper projecting edge extending inwardly beyond the outer face of the line-holder, so as to prevent it from dropping at once down through the opening in the track $D'$ by reason of the fact that the upper rail of the line-holder rests on the projecting part of the bunter. The line-holder C as it advances along the track $D'$ engages the free end of a lever I, which is secured to the upper sliding plate $T^4$, which carries the journal-box T. This movement of the lever I draws the wheel $S'$ forward in gear with the wheel $S^3$, which is secured to the shaft $S^5$, to which the eccentric $R^4$ is secured. This shaft $S^2$ immediately begins to rotate in the direction of the arrow in Fig. 1, being the reverse direction of the movement of the spacing mechanism, causing the bunter R to move in through the opening in the line-holder C, and thus pushing the line of type therein out into the galley and also pushing the entire body of type previously set along the galley a distance equal to the thickness of one line. After reaching the extreme limit of its forward movement the continued revolution of the shaft withdraws the bunter R entirely clear of the line-holder C and allows the latter, which has in the meantime passed off of the track $D'$, to drop down to the position shown in Fig. 3, where it rests on the track $D^2$. In order that the wheel $S'$ may not be drawn back to its normal position upon the dropping of the line-holder, which holds the lever I forward, and thus throwing it out of gear with the wheel $S^3$ and stopping the revolution of the shaft before it has completed the full revolution necessary to return the bunter to its normal position, a disk $J^4$ is employed with a slot cut therein to receive the edge of the plate, the construction and operation of which are exactly the same as that already shown and described in connection with the spacing mechanism, and the gear-wheel $S'$ is in the same manner held in gear with the wheel $S^3$ until the entire revolution has been completed, when the wheel is returned to its normal position by the spring $t$, acting on the sliding plate $T^4$.

It will be evident from the foregoing that as the line-holder C is moved forward to the opening in the galley the space-bars which had been used in that line of type will engage the rear end of the bunter and be pushed off on the depressed part $c^6$ of the way $c^{11}$, as may be seen in the case of the lower line-holder shown in Fig. 3. The line-holder will move off of the track D' and rest upon the projecting portion of the bunter R, which prevents it from dropping at once to the lower track D². As soon as it is emptied the bunter is withdrawn and the line-holder drops down upon the track D². There it is engaged by the frame K', provided with the spring-catch $k$, and by it it is drawn back on the track D² to the track D³, where it is carried upward to the track D' and assumes its original position for composing another line upon the depression of a treadle, as before described. In order to return the space-bars C' C' C' to the front end of the line-holder, the arm $f^{12}$ of the space-bar feed F is extended downward a short distance, as shown in Fig. 3, sufficient to enable it to engage the hangers of the space-bars on the depressed portion $c^6$ of the way $c^{11}$, bringing them to rest, while the continued movement of the line-holder carries the way $c^{11}$ through the hangers until they are brought to their normal position at the forward end of the way.

The foregoing description and the drawings referred to are substantially confined to illustrating the form and arrangement of the parts shown. It is evident, however, that in many particulars the details may be modified by the substitution of other well-known mechanical movements for some of those shown and described, being merely one approved embodiment of my invention.

Believing myself to be the first to justify and space lines of type by first introducing wedge space-bars between the words, then forcing them in to expand the line to its predetermined length, then removing the space-bars and substituting ordinary spaces, the selection of which is effected by the projecting space-bars engaging suitable trip-lever stops, which limit the movement of a reciprocating space-holder, then driving in the remaining space-bars after each substitution to again expand the line, if necessary, and repeating the operation on each space required in the line, I mean to claim the method broadly without restriction to specific details.

I claim as my invention—

1. The combination of means for assembling a line of type; means for introducing justifiers; means for forcing in the justifiers; and means for replacing the temporary justifiers by permanent spaces.

2. The combination of means for inserting temporary spreading spacing devices between types as they are assembled in line; means for causing said spacing devices to occupy greater space in the line while in contact with types on both sides of themselves, whereby said types are driven farther apart and the line is expanded; and means for thereafter replacing said spacing devices with ordinary spaces.

3. The combination of means for inserting temporary spreading spacing devices between types as they are assembled in line; means for causing said spacing devices to simultaneously expand the line; means for limiting the amount of expansion; and means for replacing said spacing devices with ordinary spaces.

4. The combination of means for inserting wedges between types as they are assembled in line; means for driving said wedges farther into said line; and means for thereafter replacing said wedges with ordinary spaces.

5. The combination of means for inserting temporary spreading spacing devices between types as they are assembled in line; means for causing said spacing devices to simultaneously expand the line; means for replacing said spacing devices with space-blanks; and means for delivering the line thus justified.

6. The combination of means for inserting temporary spreading spacing devices in a line of type while being assembled between confining-walls; means for causing said spacing devices, to simultaneously expand the line until its extremities are in contact with said walls; means for replacing said spacing devices with space-blanks; and means for removing the line thus justified from between said confining-walls.

7. The combination of a line-holder adapted to receive a line of type as it is being assembled; means for advancing the line-holder during the operation of assembling the line; temporary spacing devices; and means for replacing said spacing devices with ordinary spaces.

8. The combination of a line-holder, composed of a box, adapted to receive a line of type as it is being assembled and to convey it and limit its length during the operation of justification; temporary tapering or wedge space-bars; and means for introducing the space-bars crosswise into and through the line of type in the line-holder, between the words, during the operation of assembling type therein.

9. The combination of a line-holder composed of a box, adapted to receive a line of type as it is being assembled and to carry it and limit its length during the operation of justification, and arranged to travel in a suitable path; space-bars carried by the line-holder, arranged to be inserted therein; and means for inserting the space-bars crosswise into and through the line of type in the line-holder.

10. The combination of a line-holder, arranged to travel upon a suitable path, for holding and limiting the length of a line of type; space-bars carried by the line-holder arranged to be introduced therein; and means for introducing the space-bars successively, crosswise into and through the line of type in the line-holder after each word, during the operation of assembling type therein.

11. The combination of a line-holder, composed of a box having permanent end walls, adapted to receive a line of type as it is being assembled and to carry it and limit its length during the operation of justification, and arranged to travel in a suitable path; wedge-shaped space-bars for expanding the line of type contained in the line-holder; and means for driving in the space-bars so as to expand the line to fill out the line-holder.

12. The combination of a line-holder, composed of a box having permanent end walls, adapted to receive a line of type as it is being assembled and to carry it and limit its length during the operation of justification, and arranged to travel in a suitable path; wedge-shaped space-bars for expanding the line of type contained in the line-holder; and means for driving in the space-bars simultaneously so as to expand the line to fill out the line-holder.

13. The combination of a temporary spreading spacing device inserted between types in a line; means for causing said spacing device to occupy greater space in the line while in contact with the types on both sides of itself, whereby said types are driven farther apart; and means for thereafter replacing said spacing device with an ordinary space.

14. The combination of temporary spreading spacing devices inserted between types in a line; means for causing said spacing devices to simultaneously spread the line; and means for thereafter replacing said spacing devices with ordinary spaces.

15. The combination of one or more wedges inserted between types in a line of type; means for driving said wedges farther into the line and thereby expanding the line; and means for substituting ordinary spaces for said wedges.

16. The combination of a line-holder, composed of a box adapted to receive a line of type as it is being assembled and to carry it and limit its length during the operation of justification; means for introducing wedge-shaped or tapering space-bars into and through the line of type in the line-holder between the words during the operation of assembling the type therein; and means for driving in the space-bars after insertion so as to expand the line to fill out the line-holder.

17. The combination of a line-holder, composed of a box adapted to receive a line of type as it is being assembled, and to carry it and limit its length during the operation of justification; means substantially as described for introducing wedge-shaped or tapering space-bars successively, crosswise into and through the line of type in the line-holder after each word during the operation of assembling type therein; and means for driving in the space-bars after insertion so as to expand the line to fill out the line-holder.

18. The combination of a line-holder, composed of a box adapted to receive a line of type as it is being assembled and to carry it and limit its length during the operation of justification; means substantially as described for introducing wedge-shaped or tapering space-bars crosswise into and through the line of type in the line-holder after each word, during the operation of assembling type therein; and means substantially as described for driving in the space-bars simultaneously so as to expand the line to fill out the line-holder.

19. The combination of a line-holder, composed of a box having permanent end walls, adapted to receive a line of type as it is being assembled and to carry it and limit its length during the operation of justification; temporary wedge-shaped or tapering space-bars for expanding the line to fill out the line-holder; and means for removing the space-bars and replacing them with ordinary spaces.

20. The combination of a line-holder adapted to receive a line of type as it is being assembled and to carry it and limit its length during the operation of justification; space-bars for expanding the line to fill out the line-holder; and means substantially as described for successively removing the space-bars and replacing them with ordinary spaces.

21. The combination of a line-holder adapted to receive a line of type as it is being assembled and to carry it and limit its length during the operation of justification; space-bars for expanding the line to the required length; means for successively removing the space-bars; and means for replacing them with ordinary spaces of suitable size, aggregating in thickness the total spacing required in the line.

22. The combination of a line-holder; temporary spacing devices, capable of being caused to spread the line; means for causing said spacing devices to spread the line; and means for thereafter replacing said temporary spacing devices with ordinary spaces.

23. The combination of a line-holder capable of holding a line of type; wedges capable of being inserted between types in said line; means for driving said wedges into said line and thereby expanding the same; and means for thereafter replacing said wedges with ordinary spaces.

24. The combination of a suitable line-holder; temporary wedge-shaped space-bars inserted crosswise therein for expanding the line of type contained therein; means, substantially as described, for driving in the space-bars to expand the line to fill out the line-holder; and means for removing the space-bars and replacing them with ordinary spaces.

25. The combination of a suitable line-holder; wedge-shaped space-bars for expanding the line of type contained therein; means for driving in the space-bars so as to expand the line to fill out the line-holder; and means for removing the space-bars successively, and for replacing each space-bar upon removal with ordinary spaces.

26. The combination of a holder for holding and limiting the length of a line of type; means, whereby wedge-shaped or tapering space-bars, instead of ordinary spaces, are inserted between the words during the operation of assembling the line in the line-holder; means for driving in the space-bars after insertion, so as to expand the line to fill out the line-holder; and means for removing the space-bars and replacing them with ordinary spaces.

27. The combination of a line-holder for holding and limiting the length of a line of type; wedge-shaped space-bars for expanding the line; means for driving in the space-bars simultaneously so as to expand the line to fill out the line-holder; and means for removing the space-bars successively and replacing them with ordinary spaces.

28. The combination of a suitable holder for holding and limiting the length of a line of type; means whereby wedge-shaped or tapering space-bars, instead of ordinary spaces, are inserted between the words during the operation of assembling the line in the line-holder; means for driving in the space-bars simultaneously after insertion, so as to expand the line to fill out the line-holder; and means for removing the space-bars successively and replacing them with ordinary spaces.

29. The combination of a holder for holding and limiting the length of a line of type; means whereby wedge-shaped or tapering space-bars are inserted between the words during the operation of assembling in the line-holder; means for driving in the space-bars so as to expand the line to fill out the line-holder; and means for successively removing and replacing the bars with ordinary spaces of suitable size aggregating in thickness the total spacing required in the line.

30. The combination of one or more temporary spreading spacing devices inserted between types in line, said spacing devices adapted to be moved with reference to the line, whereby the portion of the same which is between the types may be of increased dimensions; and means set in operation by the temporary spacing devices, for selecting the ordinary spaces corresponding to the width of the space occupied by said temporary spacing devices.

31. The combination of one or more temporary spreading spacing devices, inserted between types in a line, said spacing devices being adapted to be moved with reference to the line, whereby the portion of the same which is between the types may be of increased dimensions; means set in operation by the temporary spacing devices for selecting the ordinary spaces corresponding to the width of the space occupied by said temporary spacing devices; and means for substituting said spaces so selected for the spacing devices.

32. The combination of one or more temporary spreading spacing devices inserted between types in a line of type; means for causing said spacing devices to expand the line; and means for thereafter replacing said spacing devices with ordinary spaces the thickness of which is determined by that section of the spacing device which is between the types.

33. The combination of one or more temporary spacing devices inserted between the types in a line; means for moving said devices relatively to the line; and means for determining the corresponding size of the ordinary spaces to be selected according to the distance through the line which said spacing devices have been moved.

34. The combination of a line of type; wedges inserted at desired intervals between types in said line; means for forcing said wedges farther through the line; and means for substituting for said wedges ordinary spaces the size of which is determined by the distance which said wedges project from the line.

35. The combination of a series of temporary spreading spacing devices inserted at desired intervals between types in a line; means for causing said spacing devices to expand the line; means for substituting ordinary spaces for a part of said spacing devices; and means for causing the spacing devices to again expand the line.

36. The combination of temporary spacing devices inserted in a line; means for moving said spacing devices through the line; means for replacing the spacing devices with ordinary spaces; and means for moving the spacing devices remaining, through the line, after any portion of them have been replaced with ordinary spaces.

37. The combination of temporary spacing devices inserted between types in a line; means for driving said spacing devices farther through the line; means for replacing said spacing devices successively with ordinary spaces; and means for driving farther through the line the spacing devices remaining in the line, after any portion of them have been replaced with ordinary spaces.

38. The combination of a series of temporary spreading spacing devices inserted at desired intervals between types in a line; and means for alternately causing said spacing devices to expand the line and for replacing one of said spacing devices with an ordinary space.

39. The combination of wedge-shaped or tapering space-bars inserted between types in a line; means for driving in the space-bars to expand the line; means for replacing the first space-bar in the line with an ordinary space; means for driving in the remaining space-bars so as to take up and distribute between the remaining line-spaces any looseness resulting; and means for repeating the same operation successively for each space-bar in said line.

40. The combination of a line-holder containing an expanded line of type in which wedge-shaped or tapering space-bars have been inserted and partially replaced with ordinary spaces; and means for further expanding the line, when necessary, by forcing in the remaining space-bars, so as to fill out the line-holder, whenever a space has been inserted of less thickness than the thickness of the space-bar which has been removed, at the point at which the space-bar enters the line.

41. The combination of a line-holder containing an expanded line of type, in which wedge-shaped or tapering space-bars have been inserted and partially replaced with ordinary spaces; means for further expanding the line of type by forcing in the remaining space-bars so as to fill out the line-holder, when necessary to expand the line; and means substantially as described for thereupon inserting appropriate spaces into the line to effect perfect justification.

42. The combination of a suitable line-holder containing an expanded line of type in which wedge-shaped or tapering space-bars have been inserted and partially replaced with ordinary spaces; means for further expanding the line of type, by forcing in the remaining space-bars so as to fill out the line-holder, when necessary to expand the line, after the withdrawal of a space-bar and the insertion of a space in its stead; and means substantially as described for thereupon inserting appropriate spaces into the line to effect perfect justification.

43. The combination of a line-holder containing a line of type in which wedge-shaped space-bars have been inserted; and means acting successively on the space-bars, immediately after the preceding space-bar has been removed and a space inserted, for driving in the remaining bars, so as to take up and apportion between the words of the line contained in the line-holder, any fractional part of the unit of spacing, which may be necessary to properly justify the line.

44. The combination of a line-holder containing a line of type in which wedge-shaped space-bars have been inserted; and means, actuated from the same driving-shaft, and acting successively on the remaining space-bars, after each preceding space-bar has been removed and a space inserted by the space-inserting mechanism, for driving in said space-bars so as to take up and apportion between the words held in the line-holder, any fractional part of a unit of spacing which may be necessary to properly justify the line.

45. The combination of a line-holder containing a line of type in which space-bars have been inserted and partially replaced with ordinary spaces; and a reciprocating space-bar driver, arranged to act successively on the remaining space-bars, after the insertion of each space in its proper order into the line-spaces, substantially as described.

46. The combination of a line-holder containing a line of type in which space-bars have been inserted and partially replaced with ordinary spaces; a reciprocating space-bar driver, arranged to act successively on the remaining space-bars, after the insertion of each space as the line-holder moves forward; and means connected with the driving-shaft of the machine for actuating the same.

47. The combination of a line-holder containing a line of type in which wedge-shaped or tapering space-bars have been inserted; means for removing the space-bars successively; means for inserting, instead of each bar as it is removed, ordinary spaces of thickness equal to or next less than that of the removed bar; and means for further expanding the line when necessary, after insertion of a space, by forcing in the remaining space-bars, so as to fill out the line-holder whenever a space has been inserted of less thickness than the removed space-bar, at the point at which it entered the line.

48. The combination of a line-holder containing an expanded line of type, in which wedge-shaped or tapering space-bars have been inserted and partially replaced with ordinary spaces; means for further expanding the line of type, by forcing in the remaining space-bars simultaneously so as to fill out the line-holder, when necessary, to expand the line; means, substantially as described, for removing the first space-bar then remaining in the line and replacing it with an appropriate space, and for again driving in the remaining space-bars to take up any fractional space remaining in the line and for repeating the operation until the entire line is justified.

49. The combination of a holder for holding and limiting the length of a line of type; means, whereby wedge-shaped or tapering space-bars are inserted into the line between the words during the operation of assembling in the line-holder; means for driving in the space-bars simultaneously so as to expand the line to fill out the line-holder; means for successively removing the space-bars; means for inserting in the line of type, instead of the space-bars as each is removed, ordinary spaces of thickness equal to or next less than the thickness of the space-bar which has been last removed, at the point where it enters the line; and means for driving in the remaining space-bars to expand the line to fill out the line-holder, whenever a space has been inserted of less than the proper thickness.

50. The combination of a line-holder for holding and limiting the length of a line of type; means whereby wedge-shaped or tapering space-bars are inserted into the line between the words during the operation of assembling in the line-holder; means for driving in the space-bars simultaneously, so as to expand the line to fill out the line-holder; means for successively removing the space-bars; means for inserting in the line of type, instead of the space-bars as each is removed, ordinary spaces of thickness equal to or next less than the thickness of the space-bar which has been last removed, at the point where it enters the line; and means for driving in the remaining space-bars to expand the line to again fill out the line-holder, whenever a space has been inserted of less than the proper thickness, and for repeating this operation until the entire line is justified.

51. The combination of a suitable line-holder for holding and limiting the length of a line of type; means whereby wedge-shaped or tapering space-bars are inserted into the line between the words, during the operation of assembling in the line-holder; means for driving in the space-bars simultaneously so as to expand the line to fill out the line-holder; means for successively removing the space-bars; means for inserting in the line of type, instead of the space-bars as each is removed, ordinary spaces equal to or next less in thickness than the thickness of the space-bar which has been last removed, at the point at which it entered the line; means for driving in the remaining space-bars to expand the line to again fill out the line-holder, whenever a space has been inserted of less thickness than the thickness of the removed space-bar at the point at which such space-bar entered the line, and for repeating this operation until the entire line is justified; and means for removing the justified line from the line-holder and delivering it upon a suitable galley.

52. A space-bar, consisting of a wedge having parallel planes at each end, and a uniform taper between said parallel planes.

53. A space-bar consisting of a wedge having parallel planes at each end, and having a uniform taper between said parallel planes, and provided at top and bottom with flanges.

54. A space-bar, consisting of a wedge having parallel planes at either end, a uniform taper between said planes, provided with flanges on which it slides in a suitable way, and notches in the flanges engaging with devices in the way for limiting its longitudinal movement.

55. A space-bar, of less height than the type in which it is to be used, whereby there is left above the space-bar and between the adjacent types, a space into which an ordinary space may be partially inserted before the withdrawal of the space-bar.

56. The combination of a wedge-shaped space-bar; and a hanger supporting the space-bar and in which it slides horizontally backward and forward in suitable ways.

57. The combination of a wedge-shaped space-bar; and a hanger provided with spring-catches arranged to engage with suitable notches in the surface of the space-bar, whereby the movement of the space-bar is limited in either direction.

58. The combination of a line-holder carrying a line of type; temporary spacing devices of less height than the said type inserted therein; means for inserting an ordinary space into that portion of the line which is above the space device; means for thereupon removing the spacing device; and means for then driving the ordinary space the rest of the distance into the line.

59. The combination of a temporary spacing device inserted between types in a line of type, and which is less in height than the said type; means for causing the said spacing device to spread the line; means for thereafter inserting an ordinary space into that portion of the line-space which is above the spacing device; means for thereupon withdrawing the spacing device; and means for then driving the ordinary space the rest of the distance into the line.

60. The combination of a traveling line-holder which successively travels to points where type and temporary spreading spacing devices may be inserted therein and where the spacing devices may be caused to spread the line, where the spacing devices may be replaced with ordinary spaces, and where the line may be removed from the line-holder and then back to the starting-point; and means for performing these several operations.

61. A line-holder for containing a line of type, having a rectangular channel formed on one face and closed by the frame-plate on which it slides, so as to form a rectangular receptacle, and provided with a rectangular opening extending longitudinally through its side wall.

62. A line-holder for containing a line of type, forming with the frame-plate on which it slides, a rectangular receptacle provided with a rectangular opening in its side wall and beveled on its outer surface at one end, so as to permit it to slide upon the projecting and correspondingly-beveled head of a reciprocating bunter.

63. A line-holder for containing a line of type, having a longitudinal opening in its side walls; a way or track upon which it slides; and a frame-plate provided with a longitudinal opening to which the way or track is attached, the holder and the frame-plate forming together an inclosed receptacle for the line of type, having a longitudinal opening running through both the holder and the plate.

64. The combination of a line-holder; a longitudinal way or track attached to said line-holder; a hanger sliding on said way or track; and a space-bar sliding in the hanger.

65. The combination of a line-holder; a longitudinal way or track on said line-holder, parallel to its side wall; a hanger sliding on said way or track; and a space-bar sliding horizontally on said hanger.

66. The combination of a line-holder; a way or track attached to said line-holder; a series of hangers sliding longitudinally on said way or track; and a space-bar suspended and sliding crosswise in each hanger.

67. The combination of a line-holder; a longitudinal way or track attached to said line-holder; a series of hangers sliding on said way or track; a space-bar sliding in each hanger; and devices for limiting the movement of each space-bar in each hanger.

68. The combination of a line-holder having a channel in its interior of a given length, in which a line of type is assembled; and one or more wedge-shaped or tapering space-bars, adapted to pass crosswise into and through the line-holder and between the types contained therein.

69. The combination of a line-holder; wedge-shaped or tapering space-bars; hangers upon which the space-bars move in the direction of their length; and a way or track attached to the line-holder, upon which the hangers slide horizontally.

70. The combination of a line-holder; a longitudinal way or track attached thereto, extended out beyond the line-holder at one end and there depressed to a lower level; and hangers sliding on said way or track, each carrying a space-bar.

71. The combination of a traveling line-holder, having fixed end walls adapted to receive a line of type as it is assembled, and limit its length; and means for advancing the line-holder while the type are being assembled.

72. The combination of a line-holder, having fixed end walls, adapted to receive a line of type as it is being assembled and limit its length; a suitable track on which the same travels; and means for feeding each letter as it enters the line-holder forward therein, and for causing the latter to advance along the track at the same time a distance equal to the thickness of the letter inserted.

73. The combination of a line-holder having a channel in its interior of a given length, in which a line of type is assembled; space-bars suspended in suitable hangers; and means whereby the space-bars are inserted between the words in the line-holder as the words are assembled therein.

74. The combination of a line-holder, space-bars suspended in suitable hangers, sliding on a way or track attached to the line-holder; and a sliding rod, provided with a shoulder, engaging with the space-bar of the foremost hanger, which holds the entire row of hangers stationary while the line-holder is being advanced, and forces the space-bar held in the said hanger when the rod is advanced a certain distance into the line-holder.

75. The combination of a line-holder; space-bars suspended in hangers sliding on a way or track on the line-holder; and a sliding rod having a shoulder arranged to engage with the extremity of the space-bar when the rod is advanced.

76. The combination of a line-holder; a way or track attached thereto; hangers beveled at one edge sliding on the way or track on the line-holder; and a sliding inserting-rod beveled at its extremity for separating the two foremost hangers when the inserting-rod is advanced.

77. The combination of a line-holder; a way or track attached thereto; hangers sliding on the way or track on the line-holder; a rod capable of being retracted by the operator for holding the row of hangers at the proper point on the way or track; and means for advancing the entire row of hangers when the rod is retracted.

78. The combination of a line-holder; a way or track attached thereto; hangers sliding on the way or track on the line-holder; a rod capable of being retracted by the operator, which holds the row of hangers at the proper point on the way or track, inserts the space-bar held in the foremost hanger into the line-holder, and separates the two foremost hangers after the insertion of the space-bar; and means for keeping the row of hangers continuously together and in contact with the rod and for advancing the line of hangers on the way or track when the rod is retracted.

79. The combination of a line-holder; a way or track attached thereto; hangers sliding on the way or track on the line-holder and beveled at one edge as shown; a space-bar sliding on each hanger; a sliding inserting-rod beveled at its extremity to enter between the edges of the hangers, and provided with a shoulder for engaging the ends of the space-bars; a spring for causing the rod to be held continuously advanced; and a bell-crank operated by a suitable key-lever for retracting it at will.

80. The combination of a line-holder; a way or track attached thereto; space-bars suspended in hangers sliding on the way or track in the line-holder; an inserting-rod, beveled at the forward end and provided with a shoulder actuated by a bell-crank; a key-lever for actuating the bell-crank; and a spring for forcing the inserting-rod forward until its shoulder engages with the space-bar suspended in the hanger and pushes it into the line-holder.

81. The combination of a line-holder; wedge-shaped or tapering space-bars inserted therein; means for simultaneously forcing forward the several space-bars; and means for successively withdrawing the latter.

82. The combination of a line-holder composed of a frame or box having permanent end walls in which a line of type is assembled letter by letter; temporary wedge-shaped or tapering space-bars inserted in the line of type during the operation of assembling; and a line-justifying bar which simultaneously forces the entire row of space-bars after insertion into the line, and expands the line to fill out the line-holder.

83. The combination of a line-holder; a row of hangers suspended on the way or track on the line-holder each carrying a wedge-shaped or tapering space-bar inserted in the line-holder; and a justifying-bar, against which the foremost of the row of space-bars rests when the space-bar-inserting rod is withdrawn, and which forces the entire row of space-bars, after insertion, simultaneously farther into the line and expands it to fill out the line-holder.

84. The combination of a line-holder containing a line of type; hangers attached thereto; wedge-shaped or tapering space-bars carried in the hangers inserted in the line-holder; and a line-justifying bar sliding in suitable bearings, whereby the space-bars after insertion in the line are forced simultaneously farther into the line of type and the line expanded to fill out the line-holder.

85. The combination of a line-holder; a way or track attached thereto; a row of hangers suspended on the way or track; and means for keeping the row of hangers continuously forced forward on the way, as fast as the space-bars are inserted into the line-holder.

86. The combination of a row of hangers suspended on the way or track on the line-holder; a rod attached to a bar sliding in bearings on the bed-plate of the machine; and a spring connecting the sliding bar with a convenient point on the bed-plate, whereby the rod is continuously forced forward and the hangers, against which it impinges, moved forward as fast as the space-bars are inserted into the line-holder.

87. The combination of a line-holder; a way or track attached thereto; hangers carrying space-bars sliding on said way or track; and a sliding arm attached to a suitable spring, whereby the hangers and space-bars are forced forward in a body, until they engage the line-spacing bar.

88. The combination of a line-holder; wedge-shaped or tapering space-bars suspended in hangers sliding upon a way or track on the line-holder; a space-bar-inserting rod, actuated by a suitable key, whereby the space-bars are inserted into the line at the end of each word; and a spring device for advancing or feeding the space-bars and hangers forward, after each space-bar is inserted.

89. The combination of a line-holder; a way or track attached thereto; space-bars beveled at one edge in the manner shown, and arranged to slide in suitable hangers, which in turn slide on a track or way on the line-holder; a sliding space-bar-inserting rod, beveled at its forward end to enter between the hangers, and provided on its lower surface with a suitable shoulder; a bell-crank operated by a key for retracting the inserting-rod; and a spring for advancing it; and means, substantially as described, for advancing or feeding the remaining hangers forward on the way as fast as each space-bar is inserted.

90. The combination of a vertical bed-plate; an inclined track thereon, on which the line-holder rests while being filled; a line-holder provided with a way or track attached thereto; a row of hangers, each carrying a space-bar, sliding on the way or track on the line-holder; and a justifying-bar against which the foremost space-bar, not yet inserted in the line-holder, rests.

91. The combination of a traveling line-holder from which the justified line of type has been removed; a way or track attached to said line-holder depressed at one end; hangers on the depressed portion of the way or track attached to the line-holder; means for causing the line-holder to travel along its path; and means, engaging with the hangers when the line-holder has passed a given point, for forcing the hangers back to the raised portion of the way or track, as the line-holder passes under said rod.

92. The combination of a vertical frame-plate; a horizontal way or track attached thereto, inclining upward at one end; a line-holder from which the justified line of type has been removed; a way or track attached to said line-holder, depressed at one end; means for causing the line-holder to travel along said track; and a vertical sliding rod controlled by a spring, engaging with the hangers when the line-holder has passed on to the inclined portion of the track, for forcing the hangers back to the raised portion of the way or track as the line-holder passes under said rod.

93. The combination of a line-holder sliding on a frame-plate; a frame arranged to slide on said frame-plate; and means for causing the sliding frame to engage with the line-holder.

94. The combination of a vertical frame-plate provided with an opening extending the full length of the line of travel of the line-holder; a line-holder sliding upon said frame-plate; and a frame sliding upon a track on the opposite side of said plate, provided with a spring-catch which passes through the opening and engages with the line-holder.

95. The combination of a vertical plate D, provided with the parallel openings, $K^3$, and, $K^4$; a track, $D'$, attached to said plate opposite to the opening, $K^3$; a track, $D^2$, attached to said plate opposite to the opening, $K^4$, and parallel to the plate, $D'$; a line-holder arranged to slide on said tracks in opposite directions; and means, substantially as described, for moving the line-holder from one track to the other when the end of the line is reached.

96. The combination of a frame-plate; a line-holder sliding upon said plate; a sliding frame retracted by a spring-drum provided with a spring-clutch, traveling upon a track upon the frame-plate; and a treadle connected therewith, whereby the frame is caused to move along the track until the spring-finger, which it carries, engages with the line-holder, whereupon, when the treadle is released, the line-holder is moved along its track by the spring-drum.

97. The combination of a line-holder sliding upon the vertical frame-plate; a sliding frame traveling upon a track on the frame-plate provided with a spring-catch upon the sliding frame, for engaging with the line-holder; and a drum containing a spring to which the frame is attached by a cord, for moving the frame in the other direction.

98. The combination of a line-holder sliding upon the vertical frame-plate; a sliding frame provided with a spring-catch engaging with the line-holder; a track on the frame-plate on which the sliding frame travels; a drum containing a spring connected with the frame for moving it in one direction; and a treadle connected with the frame for moving it in the other direction.

99. The combination of a frame-plate having an opening in it, extending the full length of the path of the line-holder; a line-holder sliding on the frame-plate; a sliding frame provided with a spring-catch extending through the opening and engaging with the line-holder; a track on the frame-plate on which the sliding frame travels; a drum containing a spring connected with the frame for moving it in one direction; and a treadle connected with the frame for moving it in the other direction.

100. The combination of a vertical frame-plate; a traveling line-holder; a track on one side of the frame-plate upon which the line-holder travels in one direction; and a second track on the frame-plate, below and parallel with the first track, upon which the line-holder travels in the opposite direction.

101. The combination of a vertical plate; upper and lower parallel tracks on the same side of the vertical plate; a line-holder arranged to travel thereon; and independent sliding frames for moving the line-holder upon said tracks.

102. The combination of a vertical frame-plate provided with openings extending the full length of the path of the line-holder; a line-holder sliding on said plate, parallel tracks, $k'$, and, $k^2$, attached to the opposite side of the frame-plate from the line-holder in proximity to the openings therein; frames, K, and, K', sliding on said tracks, provided each with a spring-catch extending through the opening and engaging with the line-holder; and means for moving the frames independently along the ways, substantially as described.

103. The combination of a vertical plate, D; parallel tracks, $k'$, and, $k^2$, attached thereto; frames, K, and, K', sliding on said tracks; means for moving the frame in one direction; and spring-drums for moving the frames in the other direction.

104. The combination of a line-holder arranged to slide upon a vertical frame-plate; frames arranged to slide upon suitable tracks on the frame-plate; independent rotating drums, $K^3$, and, $K^4$, attached to the frames and containing springs in their interior for winding up the drums when the frames are released; and cords or wires attached to the frames connected with a suitable treadle, whereby the frames are caused to travel on the tracks a desired distance, and, on releasing the treadle, to assume their original position, by the winding up of the springs within the drums.

105. The combination of a line-holder; a frame arranged to travel on a track on the frame-plate of the machine, and provided with a spring-clutch arranged to engage with the end of the line-holder when filled with type; a cord or chain connection the sliding frame with a drum having a spring in its interior; a second frame arranged to travel on a second similar track on the frame-plate of the machine, provided with a similar spring-clutch engaging the empty line-holder; a cord or chain connection, said second frame with a drum having a spring in its interior; a suitable device for causing the drums to wind up the cords, whereby the line-holder which has been filled is caused by the first frame to travel along the upper track to the space-holder and to the galley, and, after being emptied, is allowed to fall onto the lower track, and, is caused by the second frame to be returned thereon to its original position.

106. The combination of a traveling line-holder containing wedge-shaped space-bars for expanding the line; a movable justifying-bar; means for causing the justifying-bar to be advanced against the ends of the space-bars; and means for advancing the line-holder and contents after the justifying-bar has acted upon the ends of the space-bars.

107. The combination of a traveling line-holder adapted to receive a line of type as it is being assembled and to carry it and limit its length during the operation of justification; and means for arresting the former under a space-holder, while each space is being inserted in the line, and for releasing the line-holder after the space has been inserted and permitting it to resume its movement.

108. The combination of a frame-plate; a line-holder adapted to receive a line of type as it is being assembled, and to carry it, and limit its length during the operation of justification, moving on a track on said frame-plate; and means for arresting the line-holder on the track at any convenient point while a space is being inserted, and for releasing it after the space has been inserted.

109. The combination of a line-holder adapted to receive a line of type as it is being assembled and to carry it, and limit its length during the operation of justification; a justifying mechanism; a space-holder; means for advancing the line-holder to present successively the several line-spaces to receive corresponding ordinary spaces; and means for delivering the justified line from the holder.

110. The combination of a line-holder adapted to receive a line of type as it is being assembled, and to carry it, and limit its length during the operation of justification; a justifying mechanism; a space-holder; means for advancing the line-holder to receive corresponding ordinary spaces; and means for delivering ordinary spaces into the line-spaces, as they are successively brought into position to receive the same.

111. The combination of a traveling line-holder, having a supporting-surface for the spacing-wedges; means for successively advancing the line-holder to receive corresponding ordinary spaces; and means for delivering ordinary spaces into the line-spaces as they are successively brought into position to receive the same.

112. The combination of a traveling line-holder; and a space-holder; and wedges carried by said line-holder, and serving to direct said line-holder into suitable presentation to said space-holder, to receive therefrom ordinary spaces corresponding to the line-spaces occupied by said wedges.

113. The combination of line-holding devices; temporary spreading spacing devices adapted to enter line-spaces; means for causing said spacing devices to occupy greater space in the line while in contact with type on both sides of themselves, whereby said type are driven farther apart, and the line is spread; and means for substituting ordinary spaces for said spreading devices.

114. The combination of a line-holder; a series of temporary spreading spacing devices; a space-holder containing ordinary spaces graduated to correspond with the successive cross-sections of said spacing devices; and means for delivering corresponding ordinary spaces into the successive line-spaces.

115. The combination of means for advancing a line of type; means for driving in the space-bars set therein; a space-holder; means for bringing the line-spaces successively into position to receive the corresponding ordinary spaces; means for successively delivering the ordinary spaces into the line-spaces; and means for withdrawing the wedges.

116. The combination of a line-holder; a space-holder having a series of compartments for graduated spaces; means for advancing the line-holder, to bring the spaces in the line of type contained therein, successively into position to receive corresponding ordinary spaces from the space-holder; and means for inserting corresponding ordinary spaces in the line-spaces from the space-holder.

117. The combination of a space-holder containing a graduated series of ordinary spaces; means for advancing the line relatively thereto, whereby each successive space in the line of type contained therein is successively presented to receive the corresponding ordinary space; means alternately actuated crosswise of the line, whereby the space-bars are advanced; means whereby the corresponding ordinary space is discharged into the line-space when presented; and means for withdrawing the space-bars.

118. The combination of a line-holder; a space-holder containing ordinary spaces; a wedge-shaped or tapering space-bar adapted to enter a line-space, and determining by its cross-section the ordinary space to be inserted; and a space-discharging mechanism, whereby the corresponding ordinary space is delivered to the line-space.

119. The combination of a space-holder containing ordinary spaces; a line-carrying mechanism; wedge-shaped or tapering space-bars adapted to enter a space in the line; means for advancing the wedges to spread the line; means for substituting ordinary spaces for said wedges; and means for withdrawing the line from the carrying mechanism.

120. The combination of a moving line-holder; a reciprocating space-holder; and means, substantially as described, for arresting the line-holder under the space-holder, while a space is being inserted therefrom into the line, and for releasing the line-holder after the space has been inserted.

121. The combination of a moving line-holder; a reciprocating space-holder; means for arresting the line-holder under the space-holder while a space is being inserted; and means, set in operation by the space-holder, for releasing the line-holder after a space has been inserted and permitting it to resume its movement.

122. The combination of a moving line-holder; a line-holder brake attached to a sliding bar; a spring which holds the said bar normally against the line-holder; and mechanism operated by a cam upon the main driving-shaft of the machine, whereby when the line-holder is to be released, the spring is compressed and the bar retracted during the throw of the cam.

123. The combination of a traveling line-holder; a horizontal bar sliding in suitable bearings, provided with a knife-edge blade at the end; a spring for holding the bar normally against the line-holder; and a lever engaging therewith, actuated by a lug on the sliding arm actuating the space-holder, whereby the spring is compressed and the bar withdrawn from the line-holder when the space-holder moves back after the insertion of a space.

124. The combination of a line-holder adapted to receive a line of type as it is being assembled; means for advancing the line-holder during the operation of assembling the line; means for further advancing the line-holder so as to present successively the several spaces in the line of type contained therein to receive corresponding ordinary spaces; and means for delivering the justified line from the line-holder.

125. The combination of a line-holding mechanism; a space-holder; means for bringing the several spaces in the line of type held therein successively, and the exit for corresponding ordinary spaces into registration; and means for delivering ordinary spaces from said space-holder into the corresponding line-spaces when thus presented.

126. The combination of a trip-lever stop, composed of two connected arms at suitable angles to each other, pivoted to a plate at the point where said arms meet; and devices, substantially as described, for holding the stop in a fixed position until tripped, and then returning it to its original position after tripping.

127. The combination of a bed-plate, provided with a suitable opening; a series of trip-lever stops, each composed of two connected arms at suitable angles to each other, pivoted at the angle to the lower surface of the bed-plate, as shown, and each provided with projections on the extremity of the horizontal arms extending upward through the opening in the bed-plate above its surface; and a spring for holding each lever in position and returning it to its original position after tripping.

128. The combination of a horizontal bed-plate having an opening therein; a reciprocating space-holder; a series of trip-lever stops, substantially as shown, pivoted on a rod to the lower surface of the bed-plate; projections on the horizontal arms of each of the stops extending up through the opening in the bed-plate, and engaging with the space-holder; and the space-bars set in the line-holder, whereby the stops are tripped by contact with the space-bars.

129. The combination of a space-holder, divided into compartments, each containing a single space of the different sizes in use; a horizontal bed-plate, on which said space-holder slides a given distance, provided with an opening above the line of type in the line-holder; a series of independent trip-lever stops pivoted to a rod on the lower face of the bed-plate, each provided with a projection extending upward into the path of the space-holder and limiting its line of travel according to the number of stops that are tripped; and space-bars inserted in the line of type assembled in the line-holder which successively engage with and trip one or more stops, according to the distance which each is inserted in the line, whereby the space-holder is caused to stop at the proper point for the insertion of the appropriate space.

130. The combination of a space-holder, subdivided in its interior into compartments, each containing a single space of the different sizes in use; and a horizontal bed-plate on which it slides, provided with a suitable opening for permitting a space to be ejected from a single compartment of the space-holder into the line of type in the line-holder.

131. The combination of a reciprocating space-holder, subdivided in its interior into compartments, each containing a single space of the different sizes in use; a horizontal bed-plate on which it slides, provided with an opening through which a space is ejected into the line-holder; a valve for closing said opening; and means connecting the valve with a cam on the driving-shaft for opening and closing it at the proper time.

132. The combination of a reciprocating space-holder, L; a horizontal bed-plate, A', upon which it slides, provided with an opening, $L^2$; a sliding valve, $L^3$ closing the opening; a rod, $L^6$; a spring, $L^4$, actuating the rod, $L^6$; and a cam, $L^5$, on the driving-shaft, $S^4$, for opening and closing the valve at the proper moment.

133. The combination of a reciprocating space-holder; a plate upon which the same slides above the line-holder, provided with an opening through which the spaces are inserted into the line of type within the line-holder; and a sliding valve for closing the said opening, connected with a reciprocating lever, actuated by cam mechanism on the main driving-shaft of the machine, for opening the valve at the moment when a space is to be inserted into the line of type.

134. The combination of a series of cases containing ordinary spaces, graded in respect to thickness, and arranged with orifices in line with each other; and means, set in operation by the temporary spacing devices contained in the line of type to be justified, for delivering ordinary spaces, to the successive line-spaces, substantially corresponding in thickness to the several line-spaces.

135. The combination of a reciprocating space-holder, subdivided into compartments; a space-ejecting bar sliding vertically in the compartment below it; and means for actuating the bar, substantially as described.

136. The combination of a line-holder, containing a line of type; wedge-shaped space-bars inserted therein for expanding the line of type contained therein; a space-holder provided with suitable compartments; and a space-ejecting rod, whereby the space is ejected from the bottom of the compartment downward.

137. The combination of a line-holder; wedge-shaped space-bars inserted therein; a space-holder divided interiorly into compartments, each containing a space of the different sizes used; a bed-plate on which the space-holder slides, provided with an opening to permit the spaces to pass downward from the compartment into the space in the line of type, before the removal of the space-bar; and a space-ejecting bar, actuated by suitable mechanism, whereby the spaces in the compartment are ejected therefrom and forced down into the space in the line of type.

138. The combination of a line-holder; a reciprocating space-holder; a bed-plate upon which the same slides; ways or tracks upon the bed-plate for guiding the space-holder; mechanism upon the driving-shaft of the machine, whereby a reciprocating motion is imparted to the space-holder; a space-ejector actuated by mechanism on the main driving-shaft; a series of slides or chutes from which different sizes of spaces are supplied; a spring-gate actuated by the space-holder for closing said slide; and devices connected with the various slides, actuated by the space-ejector, for permitting the space to drop down from the corresponding slide and into the space-holder when a space has been ejected from any compartment therein.

139. The combination of a line-holder; space-bars inserted therein; a reciprocating space-holder; and a series of trip-lever stops arranged to select from the space-holder, spaces of appropriate thickness, to properly justify and space out the line of type.

140. The combination of a line-holder, space-bars inserted therein; a reciprocating space-holder; a trip-lever stop arranged to select from the space-holder spaces of appropriate thickness to properly justify and space out the line of type; and a space-bar driver for driving in the space-bars remaining in the line.

141. The combination of a space-holder; a vertically-sliding space-ejector, arranged to slide in the compartment of the space-holder from which the space is to be ejected; and means actuated from the driving-shaft for causing the ejector to act at the proper moment and expel a space and then return to its original position.

142. The combination of a reciprocating space-holder; a vertically-sliding space-ejector, arranged to slide in the compartment of the space-holder from which the space is to be ejected; a horizontal arm attached at one end to a rod sliding vertically in bearings on the bed-plate and at the other end to the ejector; a spring attached to the end of the rod at one end, and to a fixed point at the other end, for holding the rod normally in a raised position; a lug attached to the rod; and a cam on the driving-shaft engaging with and depressing the lug at the proper moment, whereby the ejector is caused to enter the compartment and eject a space and then resume its original position.

143. The combination of a line-holder; space-bars inserted therein; a reciprocating space-holder; and mechanism for causing the space-holder to move forward a given distance, and after discharging a space into the line of type, to resume its original position.

144. The combination of a line-holder; space-bars inserted therein; a space-holder divided into separate compartments; a horizontal bed-plate on which the same slides; a bar carrying a vertical lug attached to the space-holder and sliding in suitable bearings; a spring for causing the space-holder to be continuously thrown forward; an eccentric cam on the driving-shaft engaging with the lug, for retracting the space-holder at the proper time, whereby a reciprocating movement is imparted thereto; and a trip-lever actuated by the foremost space-bar in the line, for throwing the operating mechanism in and out of gear.

145. The combination of a line-holder; wedge-shaped space-bars inserted therein; a reciprocating space-holder arranged to deliver spaces to the line-holder; and a series of trip-lever stops arranged to select spaces from the space-holder.

146. The combination of a line-holder; wedge-shaped space-bars inserted therein; a reciprocating space-holder sliding upon a bed-plate; means for actuating it from the main driving-shaft; a series of trip-lever stops mounted upon the bed, the ends of which project upward through an opening in the bed-plate and limit the travel of the space-holder; and a trip-lever engaging with the space-bar for throwing the operating mechanism into and out of gear.

147. The combination of a line-holder; wedge-shaped space-bars inserted therein, traveling upon a track on the vertical frame-plate of the machine; a reciprocating space-holder containing separate compartments for the different sizes of spaces used; a horizontal bed-plate on which the space-holder travels, having an opening therein through which the spaces are admitted into the line of type; and means, substantially as described, whereby the appropriate compartment of the space-holder assumes a vertical position with reference to the opening in the bed-plate and the opening in the line of type.

148. The combination of a space-holder sliding horizontally in tracks upon a suitable bed-plate; a spring for causing the space-holder to move forward; and cam mechanism on the driving-shaft of the machine for causing it to move backward during the throw of the cam, whereby a reciprocating motion is imparted to the space-holder.

149. The combination of a space-holder provided with compartments each containing an appropriate space; a horizontal plate upon which the space-holder slides, provided with a suitable opening for permitting the space in the compartment above the opening to drop into the space in the line of type above the space-bar inserted therein; and a sliding valve for closing said opening.

150. The combination of a reciprocating space-holder; a chute or slide, whereby the space-holder is kept filled with spaces supplied from suitable channels; and a spring-gate at the base of the chute or slide, actuated by a lug upon the space-holder.

151. The combination of a space-holder; slides or chutes containing the proper sizes of spaces; a spring-gate for closing the slides at the bottom actuated by the space-holder; an ejector for ejecting the spaces from the slides; and devices connected with each slide, and actuated by the space-ejecting mechanism, whereby a space is released in the slide and caused to enter the corresponding compartment in the space-holder, as soon as a space is ejected therefrom.

152. The combination of a line-holder; space-bars provided with dovetailed heads, inserted in the line of type contained therein; and a reciprocating space-bar extractor, provided at the end with spring-catches, arranged to engage the heads of each space-bar, as it is brought in front of the extractor, when the latter is set in operation.

153. The combination of a line-holder, composed of a box adapted to receive a line of type as it is being assembled and to carry it and limit its length during the operation of justification; wedge-shaped or tapering space-bars inserted therein; and a reciprocating space-bar extractor for removing the space-bars successively.

154. The combination of a line-holder containing a line of type; movable space-bars inserted therein, arranged to slide upon suitable hangers; and mechanism actuated from the driving-shaft of the machine, whereby the space-bars are extracted one by one from the line of type, and each left suspended in its appropriate hanger when the line-holder reaches a given point on the track.

155. The combination of a line-holder; space-bars inserted therein; a space-bar extractor composed of a sliding frame, provided with two spring-catches at one end, which engage with the extremity of the space-bar and draw the same out of the line-holder; and cam mechanism for actuating said extractor, attached to the main driving-shaft of the machine.

156. The combination of a line-holder; space-bars inserted therein; a space-bar extractor composed of a sliding frame provided with a spring-catch at one end, which engages with the extremity of a space-bar and draws the same out of the line-holder; suitable cam mechanism for actuating said space-ejector, attached to the main driving-shaft of the machine; and a lever-arm engaging with the space-bar to be removed, so as to throw the cam mechanism into operation when the space-bar touches the lever.

157. The combination of a line-holder; space-bars inserted therein; a space-bar extractor composed of a sliding bar provided with two spring-catches at one end, arranged to engage with the extremity of the space-bar and draw the same out of the line-holder; a spring for drawing the space-bar extractor forward to engage with the space-bar; cam mechanism on the main driving-shaft of the machine for actuating the extractor and returning it to its normal position; and a lever-arm engaging with the space-bar to be removed, whereby the cam mechanism is thrown into operation when the space-bar touches the lever.

158. The combination of a line-holder; space-bars inserted therein; a reciprocating space-bar extractor, sliding in bearings on the bed-plate; a spring which draws the extractor continuously forward to engage with a space-bar; a cam rotating on a driving-shaft engaging with an arm on the extractor, whereby the latter is retracted by the rotation of the cam; and a lever arranged to be tripped by the end of the space-bar to be extracted, whereby the driving-shaft carrying the cam, is thrown into gear with the power-shaft by means of suitable sliding gear-wheel connections.

159. The combination of a line-holder; wedge-shaped space-bars inserted therein; a bar sliding on suitable bearings arranged to act upon the ends of the space-bars; a spring which draws the bar forward to act on the space-bars; a cam which retracts said bar, rotating with the driving-shaft carrying the cams which actuate the space-holder; and a space-bar extractor engaging with a lug upon the slide for retracting it, and so arranged with respect to the other cams upon said shaft, that the bar will act upon the space-bars remaining in line immediately after a space has been inserted into the next preceding line-space by the space-ejector.

160. The combination of a traveling line-holder, adapted to receive a line of type as it is being assembled; means for advancing the line-holder during the operation of assembling the line; means for justifying the line while held therein; and means for withdrawing the line of type therefrom and delivering it onto a galley, and returning the line-holder to a point where it is adapted to be again filled with type.

161. The combination of a traveling line-holder, adapted to receive a line of type as it is being assembled; means for advancing the line-holder during the operation of assembling the line; means for arresting the line-holder at a desired point; and means for discharging its contents onto a suitable galley.

162. The combination of a traveling line-holder, adapted to receive a line of type as it is being assembled; means for advancing the line-holder during the operation of assembling the line; and means set in motion by the line-holder, whereby it is arrested and held at the end of its path, and its contents discharged upon a suitable galley.

163. The combination of a traveling line-holder, adapted to receive a line of type as it is being assembled; means for advancing the line-holder during the operation of setting up the line; means set in motion by the line-holder, on reaching a given point, for discharging its contents upon a suitable galley; and means for causing it to be returned to the type-delivery chute of the setting mechanism.

164. The combination of a line-holder, adapted to receive a line of type as it is being assembled, traveling upon a vertical frame-plate on a suitable track; means for advancing the line-holder during the operation of setting up the line; and means for discharging the line-holder on reaching the end of the track upon a suitable galley and then permitting it to fall upon a second track upon which it is returned to the type-delivery chute of the setting mechanism.

165. The combination of a line-holder, adapted to receive a line of type as it is being assembled, traveling on a vertical frame-plate on a suitable track; means for advancing the line-holder during the operation of setting up the line; means for discharging the line-holder onto a suitable galley upon reaching the end of the track and then permitting it to fall upon a second track; and means for returning the line-holder on said second track to the type-delivery chute of the setting mechanism.

166. The combination of a line-holder, adapted to receive a line of type as it is being assembled, traveling on a vertical frame-plate on a suitable track; means for advancing the line-holder during the operation of setting up the line; and means, set in motion by the line-holder, for discharging the line-holder upon a suitable galley on reaching the end of the track, and then permitting it to fall upon a second track upon which it is returned to the type-delivery chute of the setting mechanism.

167. The combination of a line-holder, adapted to receive a line of type as it is being assembled, traveling on a vertical frame-plate on a suitable track; means for advancing the line-holder during the operation of assembling the line; means, set in motion by the line-holder, for discharging the line-holder on reaching the end of the track upon a suitable galley, and then permitting it to fall upon a second track; and means which automatically engage with the line-holder as it drops upon the second track and cause it to be returned thereon to the type-delivery chute of the setting mechanism.

168. The combination of a vertical plate, D; parallel tracks, D', and, D²; a line-holder traveling on said tracks; and a bunter, R, for holding the line-holder, after it passes off of the track D'.

169. The combination of a vertical frame-plate; a line-holder having an opening in its side wall and beveled on its outer face at the forward end sliding along said frame-plate; and a bunter having a projecting head beveled to fit the face of a line-holder, whereby the latter can pass onto and be held upon the projecting head of the former against the vertical plate.

170. The combination of a vertical frame-plate; a line-holder having an opening in its side wall and beveled on its outer face at the forward end, sliding along said frame-plate; a reciprocating bunter having a projecting head beveled to fit the face of the line-holder, whereby the latter can pass onto and be held by the projecting head of the former against the frame-plate; and means for causing the bunter to move forward and to discharge the contents of the line-holder upon a suitable galley.

171. The combination of a vertical frame-plate; a line-holder having an opening in its side wall, and beveled on its outer face at the forward end, sliding along said frame-plate; a reciprocating bunter having a projecting head beveled to fit the face of the line-holder, whereby the latter can pass onto and be held by the projecting head of the former against the frame-plate; and means, set in operation by the line-holder, upon reaching the end of its path, for causing the bunter to move forward automatically and discharge the contents of the line-holder upon a suitable galley and thereupon to be withdrawn from the line-holder.

172. The combination of a line-holder, with a horizontal opening through it; a reciprocating bunter onto which it passes on leaving the track on which it travels, arranged to slide through the opening in the line-holder; a bar sliding in suitable bearings on the bed-plate to which the bunter is attached; an eccentric cam on an auxiliary shaft arranged to engage with a gear-wheel on the main driving-shaft of the machine; a trip-lever tripped by the line-holder for engaging the said shaft with the gear-wheel on the driving-shaft; a spring device for throwing the shafts out of gear when the trip-lever is released; and devices for preventing the spring from releasing the mechanism until the auxiliary shaft has made a complete revolution.

173. The combination of a galley; a line-holder provided with an opening of the character described; a bunter or pusher attached to a bar sliding upon suitable bearings, for removing the type from the line-holder onto the galley after justification, arranged to fit closely in, and slide horizontally through, the opening in the line-holder; an eccentric cam attached to said bar and rotating on an independent driving-shaft; a pivoted lever arranged to be tripped by the line-holder upon reaching the end of its track and to throw the independent driving-shaft into gear with the main driving-shaft by means of sliding gear-wheel connections; and a spring for returning the bunter mechanism to its normal position, after the line-holder has been removed and the pressure on the trip-lever released.

174. The combination of a vertical frame-plate; parallel ways or tracks attached thereto; a line-holder sliding upon said tracks adapted to receive a line of type as it is being assembled; means for advancing the line-holder during the operation of assembling the line; means for moving the line-holder in opposite directions on said tracks; and means for automatically transferring the empty line-holder from the lower track to the upper track, upon being returned for the purpose of refilling.

175. The combination of a vertical frame-plate, D; tracks, D', and, D², on the frame-plate on which the line-holder, C, travels; a movable section of track, D³, sliding vertically on the frame-plate between the two tracks, for transferring the empty line-holder from the lower track to the upper; means for holding it normally on the level of the upper track; and means actuated by the mechanism for returning the line-holder, for simultaneously lowering the movable section to the lower track to receive the line-holder and then permitting it to return with the line-holder to its original position.

176. The combination of a vertical frame-plate, D; tracks, D', and, D², on the frame-plate on which the line-holder, C, travels; a movable section of track, D³, sliding vertically on the frame-plate between the tracks, D', and, D², for transferring the empty line-holder from the lower track to the upper; a spring, D⁶, for normally holding the section, D³, on the level of the upper track; and a cord connecting it with the treadle which draws back the line-holder over the lower track; whereby when the treadle is depressed and the line-holder drawn back, the track, D³, is simultaneously lowered to receive it, and when the treadle is released the line-holder is lifted to the level of the upper track and held there while it is refilled.

177. The combination of a vertical plate, D; tracks or ways, D', and, D², on the frame-plate; and a vertically-movable track, D³, at the ends of the tracks, D', and, D², actuated by the spring D⁶, whereby the empty line-holder is raised from the lower track to the upper track for the purpose of refilling it.

178. The combination of a vertical frame-plate provided with a longitudinal opening extending the entire length of the frame-plate; a line-holder; space-bars inserted therein; a track on the frame-plate parallel with the opening therein on which the line-holder travels; means for causing the line-holder to travel on the track; and means for subjecting the line of type in the line-holder, during the line of travel thereof, to the action of justifying devices, which replace the space-bars with ordinary spaces.

179. The combination of a vertical frame-plate, provided with a longitudinal opening extending the entire length of the frame-plate; a line-holder; space-bars inserted therein; a track on the frame-plate, parallel with the opening therein, on which the line-holder travels; means, set in motion by the operator, for causing the line to travel on the track; and means for subjecting the line of type in the holder to the action of devices which justify the line and which replace the space-bars with ordinary spaces.

180. The combination of a vertical frame-plate, provided with a longitudinal opening extending its entire length; a track on said plate on which the line-holder slides; a line-holder sliding on said track; space-bars inserted therein; means for causing the line-holder to travel along the track after the space-bars have been set; and means for arresting the line-holder while the space-bars are being withdrawn and appropriate spaces inserted in their place, and then permitting it to resume its movement after each space is inserted.

181. The combination of a vertical frame-plate, provided with a longitudinal opening extending its entire length; a track on said plate on which the line-holder slides; a line-holder sliding on said track; space-bars inserted therein; means for causing the line-holder to travel along the track after the space-bars have been set; means for arresting the line-holder while the space-bars are being withdrawn and appropriate spaces are inserted; and means for discharging the contents of the line-holder, upon arriving at the end of the track, upon a suitable galley.

182. The combination of a vertical frame-plate provided with a longitudinal opening extending its entire length; a track on said frame-plate on which said line-holder travels; a line-holder sliding in said track; space-bars inserted therein; means for causing the line-holder to travel along the track after the space-bars have been set; means for arresting the line-holder while the space-bars are being withdrawn and appropriate spaces inserted in the line of type; means for discharging the contents of the line-holder, on arriving at the end of the track, upon a suitable galley; and means whereby the empty line-holder, after discharging its contents, is caused to fall to a lower track upon the frame and is returned to the type-delivery chute.

183. The combination of a vertical frame-plate, provided with a longitudinal opening extending the entire length of the frame-plate; a track on said plate on which the line-holder slides; a line-holder sliding on said track; space-bars inserted therein; means, set in operation by the operator, for causing the line-holder to travel continuously along the track after the space-bars have been set; and means, actuated by the space-holder, for arresting the line-holder while the space-bars are being withdrawn and appropriate spaces are being inserted into the line of type contained therein, and then permitting it to resume its path after each space is inserted.

184. The combination of a vertical frame-plate, provided with a longitudinal opening extending the entire length of the frame-plate; a track on said plate on which the line-holder slides; a line-holder sliding on said track; space-bars inserted therein; means for causing the line-holder to travel along the track after the space-bars have been set; and means actuated by the space-holder for arresting the line-holder while the space-bars are being withdrawn and appropriate spaces inserted; and means actuated by the line-holder for discharging the contents of the line-holder upon a suitable galley upon arriving at the end of the track.

185. The combination of a vertical frame-plate, provided with a longitudinal opening extending the entire length of the frame-plate; a track on said frame-plate on which said line-holder travels; a line-holder sliding on said track; space-bars inserted therein; means for causing the line-holder to travel along the track after the space-bars have been set; means actuated by the line-holder for arresting the line-holder while the space-holders are being withdrawn and appropriate spaces inserted in the line of type; means actuated by the line-holder for discharging the contents of the line-holder on arriving at the end of the track upon a suitable galley; and means whereby the empty line-holder after discharging is caused to fall to a lower track upon the frame-plate, and be automatically returned to its original position for refilling.

186. The combination of a line-holder, having a horizontal opening through it; a reciprocating bunter upon which it passes on leaving the track on which it travels, arranged to slide through the opening in the line-holder; a bearing to which the bunter is attached, which in turn slides in suitable bearings on the bed-plate; an eccentric cam carried on an auxiliary shaft arranged to be thrown into gear with the gear-wheel of the power-shaft of the machine actuating said bearing; a circular disk rotating with the auxiliary shaft containing a suitable indentation on its edge; a plate attached to the bearing of the power-shaft containing a corresponding indentation, in which the disk on the auxiliary shaft rotates; a spring arranged to normally hold the gear-wheel on the power-shaft out of engagement with the gear-wheel on the auxiliary shaft; a trip-lever connected with the sliding bearing arranged to be tripped by the line-holder, whereby when the gears have been engaged they continue to rotate during an entire revolution of the auxiliary shaft and until the indentation in the disk comes opposite the indentation in the plate on the power-shaft bearing, whereupon the power-shaft is released and restored by the spring to its normal position, and the disk and plate interlocked and the gears released.

187. The combination of a line-holder, traveling on a suitable frame-plate; space-bars inserted therein; a rotating power-shaft driven from any convenient source of power; a bearing sliding on a horizontal bed-plate in which said shaft rotates; a gear-wheel on said power-shaft; a trip-lever for moving the power-shaft in the bearing arranged to be tripped by the line-holder; a driving-shaft carrying a gear-wheel and arranged to engage with the gear-wheel of the power-shaft when the latter is moved by the tripping of the trip-lever; and a series of cams on the driving-shaft for actuating the various members of the spacing mechanism so that the same will act successively on the line-holder in the proper order during a single revolution of the shaft.

188. The combination of a line-holder, traveling on a suitable frame-plate; space-bars inserted therein; a rotating power-shaft driven from any convenient source of power; a sliding bearing in which said shaft rotates; a gear-wheel on said power-shaft; a trip-lever arranged to be tripped by the line-holder for moving the shaft in the bearing; a driving-shaft carrying a gear-wheel and arranged to engage with the gear-wheel of the power-shaft when the latter is moved by tripping the lever; a series of cams upon the driving-shaft for actuating the various members of the spacing mechanism successively in their proper order; and means substantially as described for holding the line-holder stationary under the space-holder while each space-bar is being removed and a space is being inserted in its place, and for releasing it and permitting it to move forward after insertion.

189. The combination of a line-holder, traveling on a suitable frame-plate; space-bars inserted therein; a rotating power-shaft driven from any convenient source of power; a sliding bearing in which said shaft rotates; a gear-wheel on said power-shaft; a trip-lever for moving the shaft in the bearing arranged to be tripped by the line-holder; a driving-shaft carrying a gear-wheel and arranged to engage with the gear-wheel on the power-shaft when the latter is moved by tripping the lever; a cam on the driving-shaft for actuating the space-holder; a second cam on said driving-shaft for actuating the space-bar ejector; a third cam on said shaft for actuating the space-valve; a fourth cam on said shaft for actuating the space-ejector; and a fifth cam on said shaft for actuating the fractional-spacing bar; said cams being so set on the driving-shaft with respect to each other that the various members of the mechanism will act successively on the line-holder in the proper order during a single revolution of the shaft.

190. The combination of a line-holder moving on a suitable frame-plate; space-bars inserted therein; a rotating power-shaft driven from any convenient source of power; a sliding bearing in which said shaft rotates; a gear-wheel on said power-shaft; a driving-shaft carrying cams which actuate the various members of the machine; and a gear-wheel arranged to engage with the gear-wheel of the power-shaft; a circular disk rotating with the driving-shaft containing a suitable indentation on its edge; a plate attached to the bearing of the power-shaft containing a corresponding indentation, in which the disk rotates; a spring arranged to normally hold the gear-wheel on the power-shaft out of engagement with the gear-wheel on the driving-shaft; and a trip-lever connected with the sliding bearing and arranged to be tripped by the line-holder, whereby, when the gears have been engaged, they continue to rotate during an entire revolution of the driving-shaft and until the indentation in the disk comes opposite the indentation in the plate on the power-shaft bearing, whereupon the power is released and restored by the spring to its normal position, the disks and plates interlocked and the gears released.

191. The combination of a line-holder, moving on a suitable frame-plate; space-bars inserted therein, a rotating power-shaft driven from any convenient source of power; a sliding bearing capable of sliding in two directions, in which said shaft rotates; a gear-wheel on said shaft; a driving-shaft on one side of the power-shaft carrying cams which actuate the various members of the machine; and a gear-wheel arranged to engage with the gear-wheel of the power-shaft; a series of cams on the driving-shaft for actuating the various members of the mechanism, so that the same will act successively on the line-holder in proper order during a single revolution of the shaft; an auxiliary shaft carrying a gear-wheel arranged to engage with the gear-wheel of the power-shaft; a cam on the auxiliary shaft for actuating the bunter mechanism; and two trip-levers, one tripped by the ends of the foremost space-bar in the line-holder for throwing the power-shaft into gear with the driving-shaft, so that the various members of the space-bar removing and inserting mechanism will act successively on the line-holder, and the other tripped by the line-holder at the end of its line of travel, whereby the line-holder is held and its contents discharged into a suitable galley, and it is then permitted to drop upon the second track upon which it is returned to the type-delivery chute.

192. The combination of a traveling line-holder, containing a line of type in which space-bars have been inserted; a line-holder-arresting mechanism; a space-bar-extracting mechanism; a space-inserting mechanism; and a fractional-spacing mechanism, each acting successively upon the line-holder and operated by the same driving-shaft.

193. The combination of a traveling line-holder, containing a line of type in which wedge-shaped space-bars have been previously inserted; a line-holder-arresting mechanism; a space-bar-extracting mechanism; a space-inserting mechanism; and a fractional-spacing mechanism, each acting successively upon the line-holder, and operated by a single revolution of the same driving-shaft; and devices actuated by the line-holder for causing the driving-shaft to effect a single revolution.

194. The combination of a spacing mechanism; a driving-shaft arranged to engage with the power-shaft; a series of cams on the driving-shaft, connected with and actuating the various parts of the spacing mechanism successively; a line-holder-discharging mechanism; an auxiliary shaft arranged to engage with the power-shaft; a cam on the auxiliary shaft connected with and actuating the discharging mechanism; and a power-shaft arranged to alternately operate the driving-shaft and the auxiliary shaft.

195. The combination of a spacing mechanism; a driving-shaft arranged to engage with the power-shaft; a series of cams on the driving-shaft connected with and actuating various parts of the spacing mechanism successively; a line-holder-discharging mechanism; an auxiliary shaft, arranged to engage with the power-shaft; a cam on the auxiliary shaft connecting with and actuating the discharging mechanism; a power-shaft arranged to alternately operate the driving-shaft and the auxiliary shaft; and trip-levers, actuated by the line-holder, for throwing the power-shaft alternately into gear with the driving-shaft and auxiliary shaft.

196. The combination of a traveling line-holder, containing a line of type in which wedge-shaped space-bars have been previously inserted; a line-holder-arresting mechanism; a space-bar-extracting mechanism; a fractional-spacing mechanism; a driving-shaft, carrying cams, whereby the said mechanisms act successively upon the line-holder during a single revolution of the driving-shaft; the line-holder-discharging mechanism; an auxiliary shaft carrying a cam whereby the discharging mechanism acts upon the line-holder; and a power-shaft arranged to alternately operate the driving-shaft and the auxiliary shaft.

197. The combination of a traveling line-holder, containing a line of type in which wedge-shaped space-bars have been previously inserted; a line-holder-arresting mechanism; a space-bar-extracting mechanism and the fractional-spacing mechanism; a driving-shaft carrying cams whereby the said mechanisms act successively upon the line-holder during a single revolution of the driving-shaft; a line-holder-discharging mechanism; an auxiliary shaft carrying a cam, whereby the discharging mechanism acts upon the line-holder; a power-shaft arranged to alternately operate the driving-shaft and the auxiliary shaft; and trip-levers actuated by the line-holder, for throwing the power-shaft alternately into gear with the driving-shaft and the auxiliary shaft.

198. The combination of a line-holder; a longitudinal way or track on said holder; a hanger sliding on said track or way; and a space-bar of less height than the type held in the line-holder, sliding horizontally in said hanger.

199. The combination of a traveling line-holder; space-bars inserted therein of less height than the types in the line-holder; means for causing the line-holder to travel on its path; and means for subjecting the line of type in the line-holder during the line of travel thereof to the action of justifying devices which replace the space-bars with ordinary spaces.

200. The combination of a vertical frame-plate, having a longitudinal opening extending the entire length thereof; a line-holder containing a line of type; space-bars inserted therein of less height than the types in the line-holder; a track on the frame-plate parallel with the opening therein, on which the line-holder travels; means for causing the line-holder to travel on the track; means for subjecting the line of type in the line-holder, during the line of travel thereof, to the action of justifying devices, which replace the space-bars with ordinary spaces; and means for removing the justified line from the line-holder and delivering it upon a suitable galley.

201. The combination of a line-holder, containing a line of type; space-bars inserted therein of less height than the type in the line-holder, and driven in to expand the line; means for inserting successively an ordinary space into the space in the line of type above the space-bar; means for thereupon withdrawing the space-bar; and means for thereupon forcing the space thus inserted a distance equal to its entire length down into the space in the line of type.

In testimony that I claim the foregoing as my invention I have signed my name, in presence of two witnesses, this 14th day of November, 1894.

FRANK McCLINTOCK.

Witnesses:
WILLARD PARKER BUTLER,
JOHN FRENCH.